US012799314B2

(12) United States Patent
Frank et al.

(10) Patent No.: US 12,799,314 B2
(45) Date of Patent: Nov. 17, 2026

(54) FIRE-RETARDANT COPOLYMERS AND MOLDING COMPOUNDS

(71) Applicants: Hochschule Hamm-Lippstadt, Hamm (DE); Universität Siegen, Siegen (DE)

(72) Inventors: Petra Frank, Kreuztal (DE); Michael Luksin, Lippstadt (DE); Sabine Fuchs, Bielefeld (DE); Ulrich Jonas, Netphen (DE); Mateusz Patryk Andruschko, Hamm (DE)

(73) Assignees: HOCHSCHULE HAMM-LIPPSTADT, Hamm (DE); UNIVERSITÄT SIEGEN, Siegen (DE)

( * ) Notice: Subject to any disclaimer, the term of this patent is extended or adjusted under 35 U.S.C. 154(b) by 660 days.

(21) Appl. No.: 18/257,912

(22) PCT Filed: Dec. 17, 2021

(86) PCT No.: PCT/DE2021/101017
§ 371 (c)(1),
(2) Date: Jun. 16, 2023

(87) PCT Pub. No.: WO2022/128001
PCT Pub. Date: Jun. 23, 2022

(65) Prior Publication Data

US 2024/0084120 A1 Mar. 14, 2024

(30) Foreign Application Priority Data

Dec. 17, 2020 (WO) ................ PCT/DE2020/101078

(51) Int. Cl.
*C08L 25/08* (2006.01)
*C08F 2/18* (2006.01)
(Continued)

(52) U.S. Cl.
CPC ................ *C08L 25/08* (2013.01); *C08F 2/18* (2013.01); *C08F 230/02* (2013.01); *C08K 3/06* (2013.01);
(Continued)

(58) Field of Classification Search
None
See application file for complete search history.

(56) References Cited

U.S. PATENT DOCUMENTS 3,459,717 A * 8/1969 Signouret ............... C04B 28/36 524/137
5,314,963 A 5/1994 Linder et al.
(Continued)

FOREIGN PATENT DOCUMENTS

EP 0509304 A1 10/1992
WO 2006082233 A1 8/2006
(Continued)

OTHER PUBLICATIONS

Ahmed et al., "Copolymerization of Elemental Sulfur with Styrene", Journal of Applied Polymer Science, vol. 29, pp. 1225-1239. 1984.
(Continued)

*Primary Examiner* — Ha S Nguyen
(74) *Attorney, Agent, or Firm* — Heslin Rothenberg Farley & Mesiti P.C.

(57) ABSTRACT

The invention relates to flame-retarded copolymers and molding materials or molding compounds with covalently bonded sulfur and covalently bonded organic phosphorus compounds having a statistical monomer distribution. The flame-retarded copolymers and molding compounds of the invention are substantially colorless, odorless and halogen-free and can be used in the building industry and electrical industry.

24 Claims, 1 Drawing Sheet

$(\omega_{[1]} = 1 - \omega_{[2]} - \ldots - \omega_{[Z]} - \omega_{[S]})$ $(\omega_{[2]} = 0 \text{ to } <1)$ $(\omega_{[z]} = 0 \text{ to } <1)$ $(\omega_{[S]} = >0 \text{ to } <0.4)$ $= >0 \text{ to } <1$

(51) Int. Cl.

| | |
|---|---|
| ***C08F 212/08*** | (2006.01) |
| ***C08F 230/02*** | (2006.01) |
| ***C08G 75/045*** | (2016.01) |
| ***C08J 9/00*** | (2006.01) |
| ***C08J 9/16*** | (2006.01) |
| ***C08K 3/06*** | (2006.01) |
| ***C08L 25/06*** | (2006.01) |
| ***C08L 25/18*** | (2006.01) |
| ***C08L 35/06*** | (2006.01) |
| ***C08L 41/00*** | (2006.01) |
| ***C08L 81/02*** | (2006.01) |
| ***C09K 21/14*** | (2006.01) |

(52) U.S. Cl.
CPC ....... *C08L 2201/02* (2013.01); *C08L 2203/20* (2013.01); *C08L 2203/30* (2013.01)

(56) References Cited

U.S. PATENT DOCUMENTS 5,811,470 A * 9/1998 Prindle, Jr. .............. C08K 3/06 524/145
2011/0245360 A1 10/2011 Hahn et al.
2012/0172467 A1 7/2012 Bellin et al.
2016/0002380 A1 * 1/2016 Abe ...................... C08F 220/14 526/274
2017/0029704 A1 * 2/2017 Boday ................... C08F 212/08

FOREIGN PATENT DOCUMENTS

WO 2007058736 A1 5/2007
WO 2011095540 A2 8/2011
WO 2011121001 A1 10/2011
WO 2011121485 A1 10/2011
WO 2012089667 A1 7/2012
WO 2013028344 A1 2/2013
WO 2017004186 A1 1/2017
WO 2021021485 A1 2/2021

OTHER PUBLICATIONS

International Search Report and Written Opinion in International Application No. PCT/DE2021/101017, with partial translation. Apr. 11, 2022.

* cited by examiner

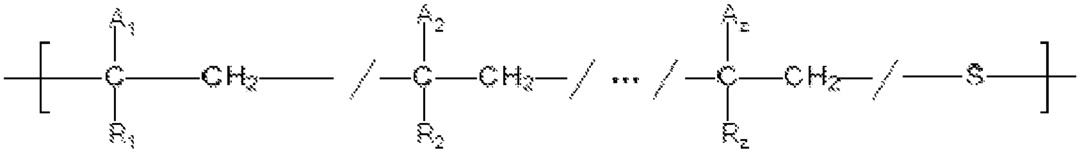
$(\omega_{[1]} = 1 - \omega_{[2]} - \ldots - \omega_{[Z]} - \omega_{[S]}) = {>0} \text{ to } {<1}$ $(\omega_{[2]} = 0 \text{ to } {<1})$ $(\omega_{[z]} = 0 \text{ to } {<1})$ $(\omega_{[S]} = {>0} \text{ to } {<0.4})$

FIRE-RETARDANT COPOLYMERS AND MOLDING COMPOUNDS

CROSS REFERENCE TO RELATED APPLICATIONS

This application is a U.S. National Phase filing under 35 U.S.C. § 371 of International Application PCT/DE2021/101017, filed Dec. 17, 2021, and published as WO 2022/128001 A1 on Jun. 23, 2022. PCT/DE2021/101017 claims priority from International application number PCT/DE2020/101078, filed Dec. 17, 2020. The entire contents of each of these prior applications are hereby incorporated herein by reference.

The present invention relates to fire-retardant copolymers and molding materials and/or compounds based on styrene having reactively bonded sulfur with a low sulfur content. Phosphorus compounds are also covalently bonded in these copolymers and molding compounds. The copolymers and molding compounds are characterized in that they are substantially colorless, odorless and also free from migrating flame-retardant additives. In addition, they are free from potentially carcinogenic antimony trioxide (ATO). The copolymers and molding compounds according to the invention have very pronounced intrinsic flame retardancy and can therefore be used in the transport/automotive sector, in the construction industry and in the electrical and electronics industry.

The finishing of styrene homo- and copolymers with flame-retardant additives is important for a large number of applications, for example for polystyrene particle foams made from expandable polystyrene (EPS) or extruded polystyrene foam sheets (XPS) for insulating buildings, as well as for injection molded parts made from HIPS, ABS, ASA etc. for use as parts and components for consumer goods in the electrical and electronics sector.

Polymers, which are made up of styrene monomers, have a total production volume of approx. 10% by weight based on the entire global plastics production and are thus the fourth largest group of the twenty plastics produced worldwide. Homopolystyrene (PS) is mainly used as a packaging material in food packaging and in disposable consumer goods. It is also used as particle foam or extruded foam in packaging and thermal insulation.

Polystyrene as such is highly flammable in the event of a fire and has no flame-retardant properties. In fact, pure polystyrene bodies burn off completely in most fire conditions and have no flame-retardant properties. In the event of a fire, there is also a lot of soot and smoke gas formation. The polymer can only be made flame-retardant by adding suitable flame-retardant additives. Due to its large surface area, intumescent and crust-forming flame-retardant systems are typically not sufficiently effective when it is used as foam. For this purpose, as described in WO 2006/082233 A1, gas-phase active flame retardants such as, for example, brominated flame-retardant additives having suitable synergists (e.g. the thermal free-radical generators dicumyl peroxide, di-tert-butyl peroxide or dicumyl) can be used. Halogen-containing flame retardants are typically persistent in the environment and release corrosive gases such as hydrogen chloride or hydrogen bromide in the event of a fire. If these flame retardants are also of low molecular weight, they are mobile in the plastic and tend to migrate out of it and accumulate in the environment and in living beings.

WO 2007/058736 A1 describes how, due to its persistent, bioaccumulative and toxic properties, the hexabromocyclododecane used in polystyrene foams in the past can be replaced by a polymeric and polybrominated flame retardant. Another alternative to the flame-retardant polystyrene polymers described thus far is blending polystyrene with other, less flammable polymers. For example, WO 2013/028344 A1 describes the fact that polystyrene can be blended with a halogenated polyphenylene ether (PPE) in order to obtain the necessary flame retardancy.

In order to be able to adjust the mechanical properties of styrene polymers, styrene can be copolymerized with a wide variety of comonomers. Depending on the comonomers used, the products are then the copolymers poly(acrylonitrile-butadiene-styrene) (ABS), poly(styrene-butadiene-styrene) (SBS), poly(styrene-acrylonitrile) (SAN), poly(acrylonitrile-styrene-acrylate) (ASA), poly(styrene butadiene) rubber (SBR), high-impact polystyrene (HIPS), polystyrene acrylates such as polystyrene methyl acrylate (SMA) and polystyrene methyl methacrylate (SMMA), methyl acrylate butadiene styrene copolymer (MBS), methyl methacrylate acrylonitrile butadiene styrene polymerisates (MABS), styrene-N-phenyl-maleimide copolymers (SPMI) and others.

The literature describes sulfur-containing flame-retardant additives having a high sulfur, content (>30%), which are used as flame-retardant synergists for phosphorus-containing flame retardants in polystyrene foams. This is the case, for example, in documents WO 2011/121001 A1 or WO 2012/089667 A1. However, these high-sulfur-containing compounds are typically characterized by an intense odor and a strong, yellow to reddish-brown color, which restricts their use in many, in particular uncolored, plastics applications or makes it impossible. Furthermore, the flame-retardant additives described do not achieve an adequate flame-retardant effect in polystyrene foams when they are used alone and without further flame retardants. The publications also only describe use as an additive; the combustibility of the pure materials is not mentioned.

Elementary sulfur as a flame-retardant additive in homopolystyrene is also described in WO 2011/095540 A2, which, however, only achieves its effectiveness in combination with a phosphorus-containing flame retardant. Individually, the sulfur in the form of an admixed flame-retardant additive in polystyrene foams remains almost ineffective with regard to flame retardancy. Furthermore, the addition of elemental sulfur to the final product always leads to a typically pronounced yellow coloration, which is undesirable in many applications. The elementary sulfur in the polymer processing process and in the end product also leads to sulfur odors that are to a greater or lesser extent pronounced.

WO 2017/004186 A1 describes the flame-retardant effect of high-sulfur thermosets for the first time. It should be possible to use these on the one hand as an additive in polyurethane foams and on the other hand as a thermosetting material. However, these sulfur copolymers have a high sulfur content of at least 40% by weight. Due to the high sulfur content and the associated unpleasant odor that high-sulfur materials typically emit due to their at least in part sulfidic structure, the use of these thermosets in many plastics applications is severely restricted.

Furthermore, thermosetting materials cannot be used in the typical applications for foamed polystyrene because their ability to be foamed is either completely impossible or at least very limited. The functionality of the material described in WO 2017/004186 A1 is based on the formation of a stable crust and on intumescence (foaming and adhesion). In the case of materials such as foamed polymers, which are characterized by a very large surface area in relation to mass, such flame-retardant mechanisms do not offer sufficient protection to pass standardized flammability tests. Test results regarding the fire behavior of these polymers are also missing in WO 2017/004186 A1.

Furthermore, the publication by Ahmed Aziz et al.: "Copolymerization of elemental sulfur with styrene," in Journal of Applied Polymer Science, Vol. 29, No. 4, Apr. 1, 1984, pages 1225-1239 describes the production of copolymers starting from the monomers styrene and sulfur, wherein the mass fraction of sulfur is below 40%.

EP 0509304 A1 also describes the production of copolymers starting from phosphate- and triazine-containing monomers in the embodiments, but these do not contain any sulfur.

WO 2011/095540 A2 describes fire-retardant molding compounds and methods for production and use thereof.

Finally, WO 2011/121485 A1 describes sulfur-containing copolymers, which, in contrast to the present copolymers, are built up from other monomer units and comprise other partial structures that have subsequently been published.

BRIEF DESCRIPTION OF THE DRAWINGS

FIG. 1 illustrates a fire-retardant copolymer according to formula (1).

DETAILED DESCRIPTION

The object of the present invention is therefore to produce copolymers and/or molding materials, for example as semi-finished products or as part of cladding or insulating materials, that have a flame-retardant or fire-retardant property in combination with covalently bonded, organic-phosphorus-containing comonomers and a low content of covalently bonded sulfur, without the need to admix further flame-retardant additives in order to achieve a sufficient fire-retardant effect.

According to the invention, this object is achieved by the features of independent claims 1 and 8.

Due to the covalent bonding of the flame-retardant groups, the copolymers according to the invention have no leaching, no odor, no inherent color and at the same time very good intrinsic flame-retardant properties. They are also free of (potentially) carcinogenic antimony trioxide and can be produced inexpensively by means of commercially available starting materials.

Novel thermoplastic copolymers and/or molding compounds were found by the copolymerization of styrene and derivatives thereof with additional phosphorus-containing monomers in the presence of small amounts of sulfur. In addition to the covalently bonded phosphorus, these copolymers and/or molding materials or masses also have an extremely small proportion of bonded sulfur while at the same time having intrinsic flame-retardant properties.

In the depiction of the present copolymers, a random distribution of the repeating units from the monomers used can be assumed. In this case, the number of repeating units "n" specified for a normal polymer chain can only be used to a limited extent because the monomer units within the polymer chain do not follow a regular repeated sequence. For this reason, a repeating unit "n" was not specified in the following formulas 1-24.

In the present case, it would therefore also be possible to define repeating units in the following formulas, which can be within the range of n=2-100,000. The square brackets nevertheless indicate a repeating sequence of the repeating units in question corresponding to the usual polymer chain representation according to the prior art. The "n" could therefore be specified in the square brackets in the following formulas (1) to (24), but this was not done for the reasons mentioned above. The depiction of the copolymer composition from different monomers with "/" is selected in accordance with the IUPAC recommendation.

According to the invention, a fire-retardant copolymer according to formula (1) having a statistical monomer distribution having the compositions (mass fractions) w with ω(1), ω(2), . . . , ω(z) and ω(S) was found (1)

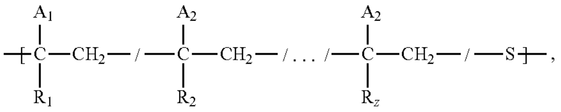

($\omega_{[1]} = 1 - \omega_{[2]} - \ldots - \omega_{[z]} - \omega_{[S]} = >0$ to $<1$) ($\omega_{[2]} = 0$ to $<1$) ($\omega_{[z]} = 0$ to $<1$) ($\omega_{[S]} = >0$ to $<0.4$)

wherein ω with ω(1), ω(2), . . . , ω(z) and ω(S) represents a molecular structure of a number of repeating units and the sum of the mass fractions w of the monomer units with ω(1), ω(2), . . . , ω(z) and ω(S) is equal to 1, z is a natural number between 3 and ∞ and ω(S) corresponds to the mass fraction of sulfur in the copolymer, wherein the substituents $A_1, A_2, \ldots, A_z$ on the monomer units are the same, where $A_1=A_2, \ldots, =A_z$, or have at least one different substituent, where $A_1=A_2, \ldots, \neq A_z$, or all substituents are different, where $A_1\neq A_2 \ldots \neq A_z$, wherein the substituents $A_1, A_2, \ldots, A_z$ are selected from the groups:

$C_{(1)}$- to $C_{(18)}$-alkyl, $C_{(2)}$- to $C_{(18)}$-alkenyl, $C_{(2)}$- to $C_{(13)}$-alkynyl, $C_{(6)}$- to $C_{(14)}$-aryl, $C_{(3)}$- to $C_{(10)}$-cycloalkyl, $C_{(6)}$- to $C_{(14)}$-aryl-$C_{(1)}$- to $C_{(18)}$-alkyl, OH, $NH_2$, H, wherein the number "x" given in parentheses indicates the number of carbon atoms in the hydrocarbon chain for C(x), and the substituents $R_1, R_2, \ldots, R_z$ have a molecular structure in which $R_1, R_2, \ldots, R_z$ are the same, where $R_1=R_2, \ldots, =R_z$, or have at least one different substituent, where $R_1=R_2, \ldots, \neq R_z$, or all substituents are different, where $R_1\neq R_2, \ldots, \neq R_z$, and the substituents $R_1, R_2, \ldots, R_z$ are selected from the groups:

$C_{(1)}$- to $C_{(18)}$—(X)-alkyl, $C_{(2)}$- to $C_{(18)}$—(X)-alkenyl, $C_{(2)}$- to $C_{(18)}$—(X)-alkynyl, $C_{(6)}$- to $C_{(14)}$—(X)-aryl, $C_{(3)}$- to $C_{(10)}$—(X)-cycloalkyl, $C_{(6)}$- to $C_{(14)}$-aryl-$C_{(1)}$- to $C_{(18)}$—(X)-alkyl, heteroaryl, which contains one or more heteroatoms from the group N, O, P and S, $(CH_2)_n$ or $(CH_2)_n$—O— or $(CH_2)_n$—N or $(CH_2)_n$—S— linked cyclotriphosphazenes (T) having the same molecular groups ($R_I=R_{II}$) or different molecular groups ($R_I\neq R_{II}$), aryl or aryl having covalently bonded vinyl or aryl having a covalent bond to another polymer of formula (1)

S—{$C_{(1)}$- to $C_{(18)}$}-alkyl, S—{$C_{(1)}$- to $C_{(18)}$}-alkenyl, S—{$C_{(2)}$- to $C_{(12)}$}-alkynyl, S—{$C_{(6)}$- to $C_{(14)}$}-aryl, S—{$C_{(3)}$- to $C_{(10)}$}-cycloalkyl, {$C_{(6)}$- to $C_{(14)}$}-aryl-{$C_{(1)}$— to $C_{(18)}$}-alkyl-S, OH, F, Cl, Br, H, $Y_1$—$P(Y_2)_pR_IR_{II}$, $Y_1$—$P(Y_2)_pR_I$, $P(Y_2)_pR_IR_{II}$,
$COOR_{IV}$ or CO—X,
wherein $Y_1$═O, S, methylene, methylene-O— or $NR_{III}$;
$Y_2$═O or S and
p is 0 or 1 and
(X) substituents can comprise —$Y_1$—$P(Y_2)pR_IR_{II}$ or $P(Y_2)pR_IR_{II}$ with one or more hydrogen atoms and
$R_I$ to $R_{IV}$ are selected from the molecular groups:

$R_I$ $C_{(1)}$- to $C_{(18)}$-alkyl, $C_{(2)}$- to $C_{(18)}$-alkenyl, $C_{(2)}$- to $C_{(18)}$-alkynyl, $C_{(6)}$- to $C_{(14)}$-aryl, $C_{(3)}$- to $C_{(10)}$-cycloalkyl, $C_{(6)}$- to $C_{(14)}$-aryl-$C_{(1)}$- to $C_{(18)}$-alkyl, a heteroaryl group containing one or more heteroatoms from the group N, O, P and S, alkoxy or N-alkoxy or S-alkoxy groups having a terminal vinyl group or a crosslinking to a further copolymer of formula (1), O—{$C_{(1)}$- to $C_{(18)}$}-alkyl, O—{$C_{(2)}$- to $C_{(18)}$}-alkenyl, O—{$C_{(2)}$- to $C_{(18)}$}-alkynyl, O—{$C_{(6)}$- to $C_{(14)}$}-aryl, O—{C(3)- to $C_{(10)}$}-cycloalkyl, {$C_{(6)}$- to $C_{(14)}$}-aryl-{$C_{(1)}$- to $C_{(18)}$}-alkyl-O, POH, F, Cl, Br or H, $R_{II}$ $C_{(1)}$- to $C_{(18)}$-alkyl, $C_{(2)}$- to $C_{(18)}$-alkenyl, $C_{(2)}$- to $C_{(18)}$-alkynyl, $C_{(6)}$- to $C_{(14)}$-aryl, $C_{(3)}$- to $C_{(10)}$-cycloalkyl, $C_{(6)}$- to $C_{(14)}$-aryl-$C_{(1)}$- to $C_{(18)}$-alkyl, a heteroaryl group containing one or more heteroatoms from the group N, O, P and S, alkoxy or N-alkoxy or S-alkoxy groups having a terminal vinyl group or a crosslinking to a further copolymer of formula (1), O—{$C_{(1)}$- to $C_{(18)}$}-alkyl, O—{$C_{(2)}$- to $C_{(18)}$}-alkenyl, O—{$C_{(2)}$- to $C_{(18)}$}-alkynyl, O—{$C_{(6)}$- to $C_{(14)}$}-aryl, O—{$C_{(3)}$- to $C_{(10)}$}-cycloalkyl, {$C_{(6)}$- to $C_{(14)}$}-aryl-{$C_{(1)}$- to $C_{(18)}$}-alkyl-O, POH, F, Cl, Br or H, $R_{III}$ H, $C_{(1)}$- to $C_{(18)}$-alkyl, $P(Y_2)pR_IR_{II}$ or $P(Y_2)pR_IR_{II}$ and $R_{IV}$ H, $C_{(1)}$- to $C_{(18)}$—(X)-alkyl, $C_{(2)}$- to $C_{(18)}$—(X)-alkenyl, $C_{(2)}$- to $C_{(18)}$—(X)-alkynyl, $C_{(6)}$- to $C_{(14)}$—(X)-aryl, $C_{(3)}$- to $C_{(10)}$—(X)-cycloalkyl, $C_{(6)}$- to $C_{(12)}$-aryl-$C_{(1)}$- to $C_{(18)}$—(X)-alkyl and wherein the sulfur content is <40% within the flame retardant copolymer according to formula (1).

It should be noted that specifying z as a natural number between 3 and W represents only a theoretical quantity for z=∞.

The copolymers formed according to formulas (1) to (24) and/or molding compounds formed therefrom are flame-retardant and/or self-extinguishing and substantially colorless and/or odorless. For the purposes of the application, substantially colorless is to be understood as meaning the absence of visible colorations. These colorations correspond to the perceived RAL color types, including but not limited to, RAL 1013 Oyster white, RAL 9001 Cream, RAL 9003 Signal white, RAL 9010 Pure white and/or RAL 9016 Traffic white.

Odorless in relation to the copolymers and molding compounds can mean the olfactory perception of sulfide compounds of less than 50 μg/$m^3$ of air, or less than 5 μg/$m^3$ of air (e.g. hydrogen sulfide, dimethyl sulfide, methyl mercaptan), or even less than 0.5 μg/$m^3$ of air (e.g. thiophenol, thiocresol, diphenyl sulfide, propyl mercaptan, ethyl mercaptan, crotyl mercaptan, amyl mercaptan, benzyl mercaptan, amyl mercaptan, allyl mercaptan), wherein the sulfide compounds have a different odor threshold depending on their chemical structure and are perceived differently from individual to individual.

Furthermore, the intrinsically flame-retardant copolymers are characterized in that the phosphorus- or sulfur-containing groups are covalently bonded to the copolymer and cannot migrate out of it.

A copolymer formed from the formula (1) can form a single component of a molding compound or can be a co-component of a molding compound. According to the definition, the term "molding compound" should be understood to mean workpieces containing copolymers, which form a molding material for producing molded bodies or semi-finished products or finished parts. The molding compound is processed into semi-finished or finished parts by means of mechanical force and/or an increased temperature of <250 °C by means of a processing method such as extrusion, pressing, transfer molding or injection molding in molds and subsequent cooling.

Within the scope of the application, a semi-finished product is considered to be a prefabricated raw material or material or semi-finished product of the simplest form, which can usually consist of a single material or a single compound such as a single copolymer according to the invention, but does not have to consist of just a single material or a single compound such as a single copolymer according to the invention. It is thus possible for at least one copolymer according to the invention to form a workpiece or semi-finished product with at least one other copolymer and/or one other polymer and/or another material such as metal (e.g. aluminum and/or iron) and/or plastic (e.g. polyurethane and/or polycarbonate) and/or ceramics (e.g. kaolin and/or silicates and/or clay materials) and/or prepregs, BMC or SMC together. That is to say, the molding compound or material can consist of a copolymer according to the invention and/or at least one further polymer and/or an additional copolymer according to the invention. The molding compound, the molding material or the molded body can also comprise a copolymer according to the invention and/or another polymer and/or an additional copolymer according to the invention and/or another material such as metal (e.g. aluminum and/or iron) or plastic (e.g. polyurethane and/or polycarbonate) or ceramics (kaolin and/or silicates and/or clay materials) together for a semi-finished product. It is also possible for the molding compound, the molding material or the molded body to surround the material or the workpiece as a coating in part or in full, or for the material or the workpiece to be embedded in the molding compound, the molding material or the molded body.

For example, simple profiles, construction profiles, rods, tubes and plates are referred to as semi-finished products. Molding materials that have already acquired an individual shape in a preparatory production step but are still intended for further production steps are further processed in a second step, for example by means of forming in the next step, either into a finished part or initially into another semi-finished product.

This is how finished components, finished building elements (e.g. construction profiles, bricks or insulating materials) or finished building blocks are created from the semi-finished products.

The material and surface qualities are often optimized for specific purposes and manufacturing processes. By way of example, but not exclusively, the copolymers formed from the formula (1) can be individual components or co-components of a molding compound or a molding material that are used as semi-finished products, for example as insulating materials in the construction industry.

The molding compound or the molding material can in this respect contain a single copolymer or other polymers and/or copolymers and/or aggregates and/or additives, the properties of which are based on the desired use, for example in house or plant construction or in automobile construction. It is possible that the molding materials or compounds additionally contain further additives such as flame retardants such as melamine, melamine polyphosphate, melamine cyanurate, metal oxides, metal hydroxides, cyclotriphosphazenes, phosphates, phosphinates, phosphine oxides, hypophosphites or expanded graphite. Additional halogen-free flame retardants such as Aflammit PCO 900, Exolit OP 930, Exolit OP 1312, DOPO, HCA-HQ, Cyagard RF-1241, 20 Cyagard RF-1243, Fyrol PMP, Phoslite B85AX, Melapur 200, Melapur MC and Budit 669, for example, would be available as suitable additives:

In this context, compounds such as 2,4,8,10-tetraoxa-3,9-diphosphaspiro [5.5]undecane-3,9-dimethyl-3,9-dioxide (0.1-10% by weight) or hexakisphenoxycyclotriphosphazene (0.5-20% by weight) can also be named as additives.

In the context of the present invention, the fire-retardant and/or self-extinguishing copolymers or the molding compounds or molding materials or semi-finished products have an optional odorless and/or colorless embodiment.

A copolymer or a molding material formed from a molding compound has at least a flame-retardant or fire-retardant effect on contact with a flame or, depending on the substituents, is self-extinguishing. The copolymers and/or molding compounds according to the invention are free from antimony trioxide and can be obtained free from halogen-containing components.

Compounds comprising copolymers or molding materials having a random monomer distribution of the formulas (2) to (24) were found with a statistical monomer distribution of monomer units having the mass fraction ω with ω(Sty), ω(S). The sum of the mass fractions ω(Sty) and ω(S) is 1.

The above-mentioned applies to the following compounds of the formulas (2) to (24). In the structural formula of the copolymer shown here, the indication of the index "n" in the square brackets was also omitted for the reasons described above. In the present case, it would also be possible to define repeating units in the following formula, which would be within the range of n=2-100,000, but these were omitted below because of the random sequence of the repeating units.

(2)

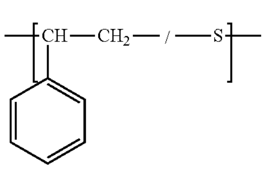

($\omega_{[Sty]} = 1 - \omega_{[S]}$) = >0 to <1  ($\omega_{[S]}$ = >0 to <0.4)

Furthermore, compounds comprising copolymers having a random monomer distribution of the formula (3) were found with a statistical monomer distribution of monomer units having the mass fraction ω with ω(Sty), ω(S) and ω(DVB). The sum of the mass fractions ω(Sty), ω(S) and ω(DVB) is 1.

For the following compounds having the formulas (3) to (24), the above-mentioned applies. In the structural formula of the copolymer shown here, the indication of the index "n" in the square brackets was also omitted for the reasons described above. In the present case it would also be possible to define repeating units in the following formula, which would be within the range of n=3-100,000, but these were omitted below because of the random sequence of the repeating units and (3)

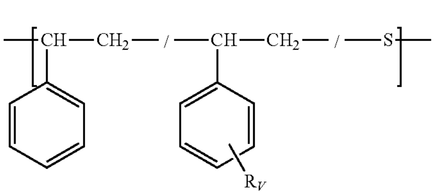

($\omega_{[Sty]} = 1 - \omega_{[DVB]} - \omega_{[S]}$) = >0 to <1  ($\omega_{[DVB]}$ = >0 to <1)  ($\omega_{[S]}$ = >0 to <0.4)

wherein $\omega_{[DVB]}$ corresponds to the mass fraction of divinylbenzene and

Rv means consisting of vinyl or a covalent bonding to another polymer of formula (1).

Furthermore, compounds comprising copolymers having a random monomer distribution of the formula (4) were found with a statistical monomer distribution of monomer units having the mass fraction ω with ω(Sty), ω(S) and ω(CTP). The sum of the mass fractions ω(Sty), ω(S) and ω(CTP) is 1.

The above-mentioned applies to the following compounds having the formula (4). In the structural formula of the copolymer shown here, the indication of the index "n" in the square brackets was also omitted for the reasons described above. In the present case it would also be possible to define repeating units in the following formula, which would be within the range of n=3-100,000, but these were omitted below because of the random sequence of the repeating units and (4)

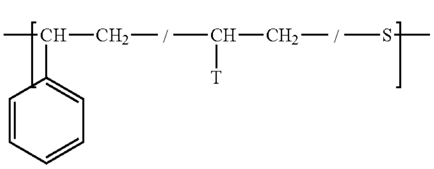

($\omega_{[Sty]} = 1 - \omega_{[CTP]} - \omega_{[S]}$) = >0 to <1  ($\omega_{[CTP]}$ = >0 to <1)  ($\omega_{[S]}$ = >0 to <0.4)

wherein $\omega_{[Sty]}$ corresponds to the mass fraction of styrene, $\omega_{[CTP]}$ corresponds to the mass fraction of cyclotriphosphazene and $\omega_{[s]}$ corresponds to the mass fraction of sulfur, wherein T=

(5)

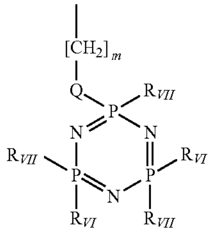

, $R_{VI}$ $C_{(1)}$- to $C_{(18)}$-alkyl, $C_{(2)}$- to $C_{(18)}$-alkenyl, $C_{(2)}$- to $C_{(18)}$-alkynyl, $C_{(6)}$- to $C_{(14)}$-aryl, $C_{(3)}$- to $C_{(10)}$-cycloalkyl, $C_{(6)}$- to $C_{(14)}$-aryl-$C_{(1)}$- to $C_{(18)}$-alkyl, a heteroaryl group containing one or more heteroatoms from the group N, O, P and S, alkoxy or N-alkoxy or S-alkoxy groups having a terminal vinyl group or a crosslinking to a further copolymer of formula (1), O—{$C_{(1)}$- to $C_{(18)}$}-alkyl, O—{$C_{(2)}$- to $C_{(18)}$}-alkenyl, O—{$C_{(2)}$- to $C_{(18)}$}-alkynyl, O—{$C_{(6)}$- to $C_{(14)}$}-aryl, O—{$C_{(3)}$- to $C_{(10)}$}-cycloalkyl, {$C_{(6)}$- to $C_{(14)}$}-aryl-{$C_{(1)}$- to $C_{(18)}$}-alkyl-O, POH, F, Cl, Br or H, $R_{VII}$ $C_{(1)}$- to $C_{(18)}$-alkyl, $C_{(2)}$- to $C_{(18)}$-alkenyl, $C_{(2)}$- to $C_{(18)}$-alkynyl, $C_{(6)}$- to $C_{(14)}$-aryl, $C_{(3)}$- to $C_{(10)}$-cycloalkyl, $C_{(6)}$- to $C_{(14)}$-aryl-$C_{(1)}$- to $C_{(18)}$-alkyl, a heteroaryl group containing one or more heteroatoms from the group N, O, P and S, alkoxy or N-alkoxy or S-alkoxy groups having a terminal vinyl group or a crosslinking to a further copolymer of formula (1), O—{$C_{(1)}$- to $C_{(18)}$}-alkyl, O—{$C_{(2)}$- to $C_{(18)}$}-alkenyl, O—{$C_{(2)}$- to $C_{(18)}$}-alkynyl, O—{$C_{(6)}$- to $C_{(14)}$}-aryl, O—{$C_{(3)}$- to $C_{(10)}$}-cycloalkyl, {$C_{(6)}$- to $C_{(14)}$}-aryl-{$C_{(1)}$- to $C_{(18)}$}-alkyl-O, POH, F, Cl, Br or H, Q is equal to 0, N, and/or S and m=1-10.

Furthermore, compounds comprising copolymers were found with a random monomer distribution of the formula (6) to (24) having a statistical monomer distribution of monomer units having the mass fraction ω with ω(Sty), ω(P) and ω(S), in which ω(S) and ω(P) correspond to the mass fraction of the sulfur-containing and potentially phosphorus-containing repeating unit. The sum of the mass fractions in a copolymer having the formulas (6) to (24) are in each case monomer units having the mass fractions w with ω(Sty), ω(P) and ω(S)=1.

The above-mentioned applies to the following compounds of the formula (6). In the structural formulas of the copolymers shown here, the indication of the index "n" in the square brackets was also omitted for the reasons described above. In the present case, it would therefore also be possible to define repeating units in the following formulas, which can be within the range from n=3 to 100,000, wherein the random monomer distribution made it possible to do without an indication of "n" in the repeating units in formulas (6) to (24).

(6)

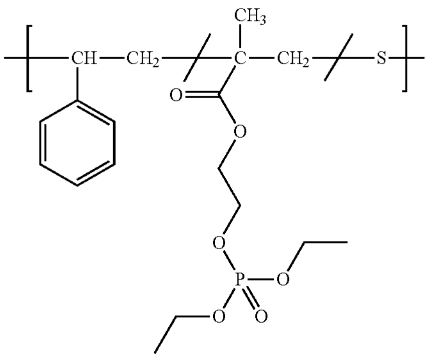

$(\omega_{[Sty]} = 1 - \omega_{[P]} - \omega_{[S]}) = {>}0$ to ${<}1$  $(\omega_{[P]} = {>}0$ to ${<}1)$  $(\omega_{[S]} = {>}0$ to ${<}0.4)$ -continued (7)

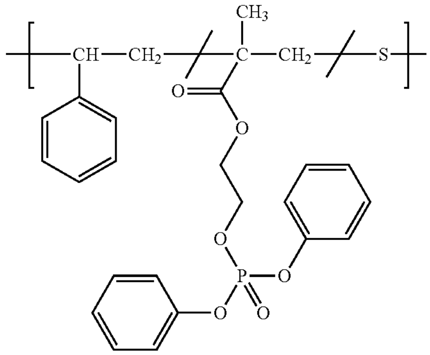

$(\omega_{[Sty]} = 1 - \omega_{[P]} - \omega_{[S]}) = {>}0$ to ${<}1$  $(\omega_{[P]} = {>}0$ to ${<}1)$  $(\omega_{[S]} = {>}0$ to ${<}0.4)$ (8)

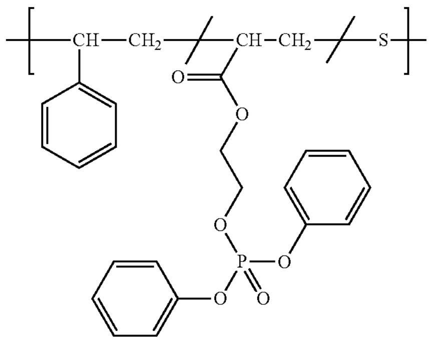

$(\omega_{[Sty]} = 1 - \omega_{[P]} - \omega_{[S]}) = {>}0$ to ${<}1$  $(\omega_{[P]} = {>}0$ to ${<}1)$  $(\omega_{[S]} = {>}0$ to ${<}0.4)$ (9)

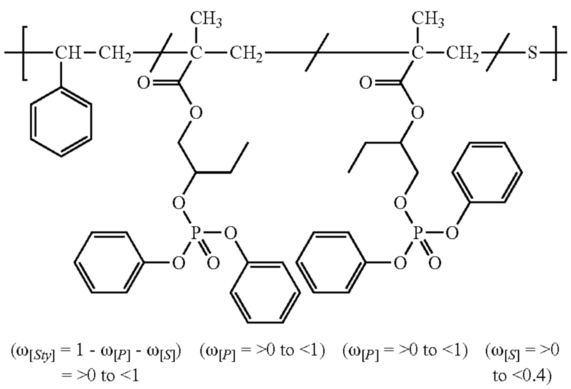

$(\omega_{[Sty]} = 1 - \omega_{[P]} - \omega_{[S]}) = {>}0$ to ${<}1$  $(\omega_{[P]} = {>}0$ to ${<}1)$  $(\omega_{[P]} = {>}0$ to ${<}1)$  $(\omega_{[S]} = {>}0$ to ${<}0.4)$ -continued (10)

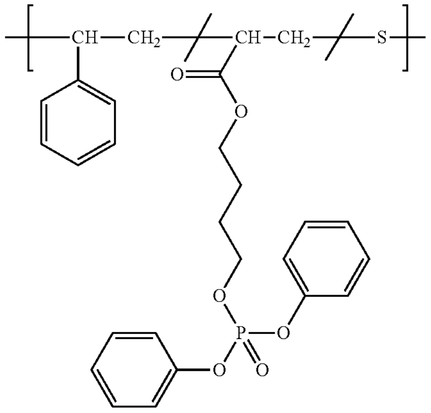

($\omega_{[Sty]} = 1 - \omega_{[P]} - \omega_{[S]}$) ($\omega_{[P]}$ = >0 to <1) ($\omega_{[S]}$ = >0 to <0.4)
= >0 to <1

(11)

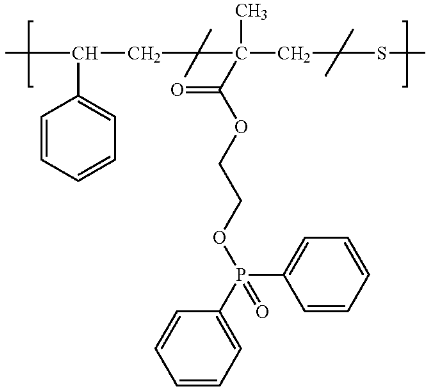

($\omega_{[Sty]} = 1 - \omega_{[P]} - \omega_{[S]}$) ($\omega_{[P]}$ = >0 to <1) ($\omega_{[S]}$ = >0 to <0.4)
= >0 to <1

(12)

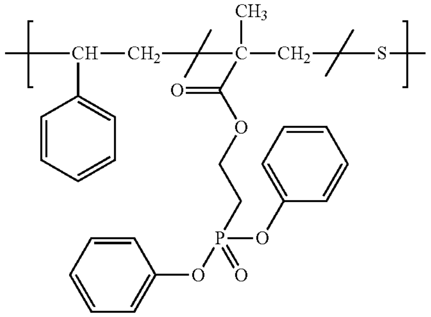

($\omega_{[Sty]} = 1 - \omega_{[P]} - \omega_{[S]}$) ($\omega_{[P]}$ = >0 to <1) ($\omega_{[S]}$ = >0 to <0.4)
= >0 to <1

-continued (13)

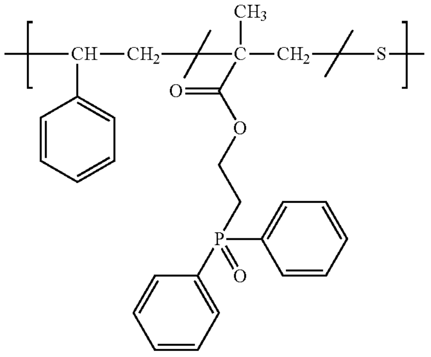

($\omega_{[Sty]} = 1 - \omega_{[P]} - \omega_{[S]}$) ($\omega_{[P]}$ = >0 to <1) ($\omega_{[S]}$ = >0 to <0.4)
= >0 to <1

(14)

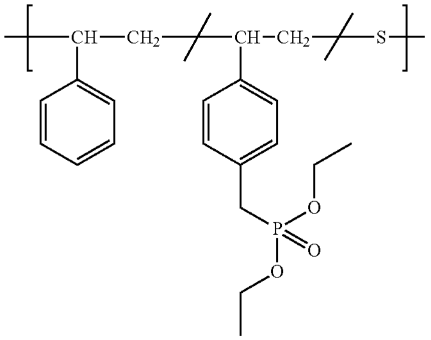

($\omega_{[Sty]} = 1 - \omega_{[P]} - \omega_{[S]}$) ($\omega_{[P]}$ = >0 to <1) ($\omega_{[S]}$ = >0 to <0.4)
= >0 to <1

(15)

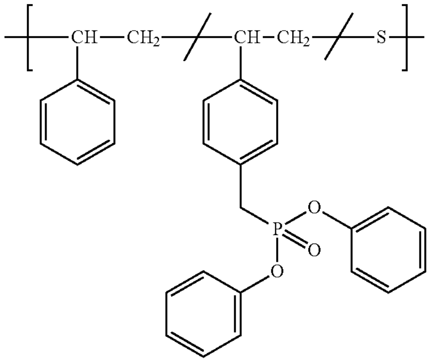

($\omega_{[Sty]} = 1 - \omega_{[P]} - \omega_{[S]}$) ($\omega_{[P]}$ = >0 to <1) ($\omega_{[S]}$ = >0 to <0.4)
= >0 to <1

(16)

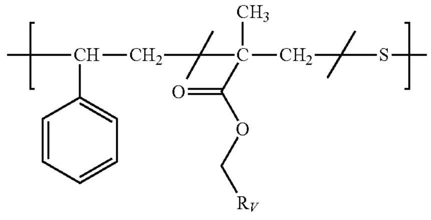

($\omega_{[Sty]} = 1 - \omega_{[AMA]} - \omega_{[S]}$ ($\omega_{[AMA]}$ = >0 to <1) ($\omega_{[S]}$ = >0 to <0.4)
= >0 to <1

-continued (17)

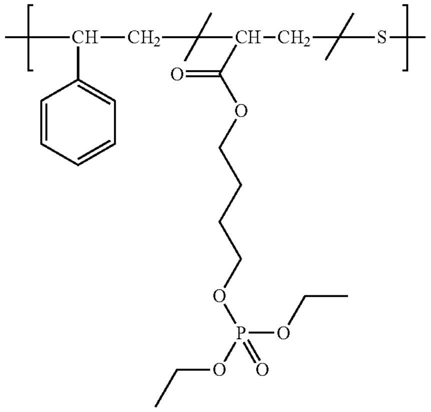

$(\omega_{[Sty]} = 1 - \omega_{[P]} - \omega_{[S]}) = >0$ to $<1$ $(\omega_{[P]} = >0$ to $<1)$ $(\omega_{[S]} = >0$ to $<0.4)$ (18)

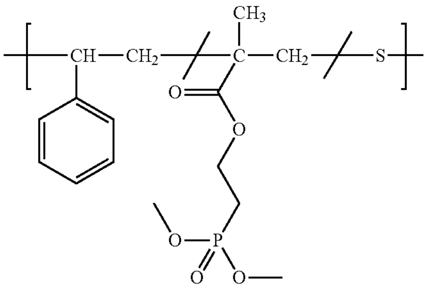

$(\omega_{[Sty]} = 1 - \omega_{[P]} - \omega_{[S]}) = >0$ to $<1$ $(\omega_{[P]} =>0$ to $<1)$ $(\omega_{[S]} =>0$ to $<0.4)$ (19)

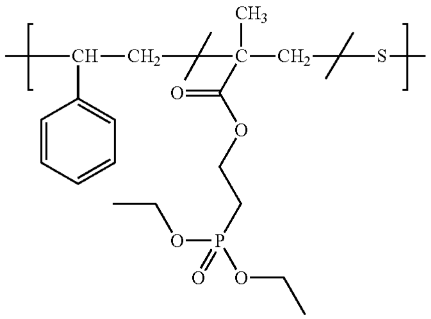

$(\omega_{[Sty]} = 1 - \omega_{[P]} - \omega_{[S]}) = >0$ to $<1$ $(\omega_{[P]} = >0$ to $<1)$ $(\omega_{[S]} = >0$ to $<0.4)$ (20)

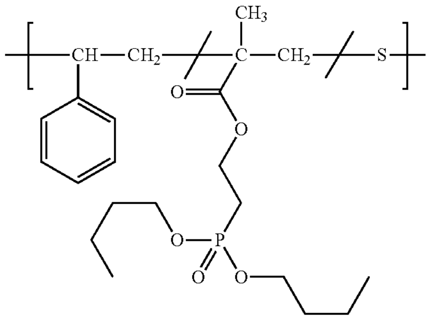

$(\omega_{[Sty]} = 1 - \omega_{[P]} - \omega_{[S]}) = >0$ to $<1$ $(\omega_{[P]} = >0$ to $<1)$ $(\omega_{[S]} = >0$ to $<0.4)$ -continued (21)

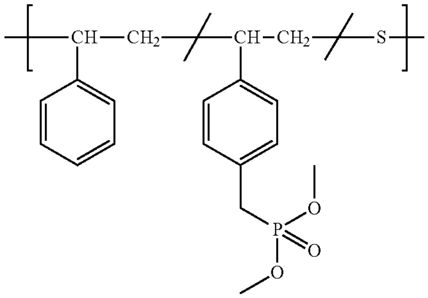

$(\omega_{[Sty]} = 1 - \omega_{[P]} - \omega_{[S]}) = >0$ to $<1$ $(\omega_{[P]} = >0$ to $<1)$ $(\omega_{[S]} = >0$ to $<0.4)$ (22)

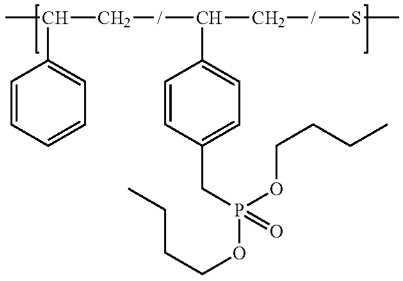

$(\omega_{[Sty]} = 1-\omega_{[P]}-\omega_{[S]}) = >0$ to $<1$ $(\omega_{[P]} = >0$ to $<1)$ $(\omega_{[S]} = >0$ to $<0.4)$ (23)

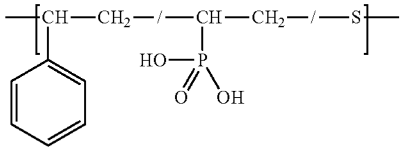

$(\omega_{[Sty]} = 1-\omega_{[P]}-\omega_{[S]}) = >0$ to $<1$ $(\omega_{[P]} = >0$ to $<1)$ $(\omega_{[S]} = >0$ to $<0.4)$ (24)

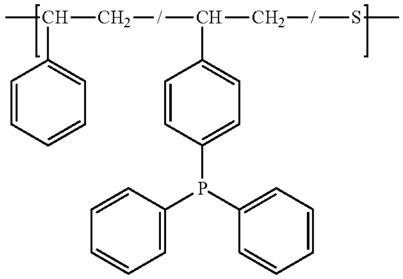

$(\omega_{[Sty]} = 1-\omega_{[P]}-\omega_{[S]}) = >0$ to $<1$ $(\omega_{[P]} = >0$ to $<1)$ $(\omega_{[S]} = >0$ to $<0.4)$ The copolymers according to the invention are already flame-retardant and/or self-extinguishing as individual compounds or as components of molding materials or compounds. Flame-retardant means that after an initial ignition, a copolymer or a molding material or molding compound comprising a copolymer has shorter afterburn times compared to homostyrene. Self-extinguishing means that an ignited copolymer or a molding material or molding compound will be extinguished within five seconds after a burner flame is removed from the copolymer or molding material or molding compound. These molding compounds can be obtained by physical mixing (blending) with other polymers and copolymers in any proportion.

The copolymers and molding materials or compounds according to the invention have no halogen-containing substituents and are halogen-free in this respect, which means that they are environmentally compatible both when it comes to production, use and disposal and in the event of a fire.

Furthermore, fire-retardant molding materials or compounds for extrusion (or for pressing, casting or foaming) have been found that have at least one fire-retardant copolymer having a sulfur content of less than 5%.

Due to the thermoplastic properties of the copolymers and/or molding compounds, a large number of applications can be covered by a wide variety of shaping. Because foam bodies can also be produced as molding material from the copolymers and/or molding compounds, they can be used, for example, as thermal insulation materials.

The foams produced from the fire-retardant copolymers preferably have a density within the range of 5 to 200 kg/$m^3$, particularly preferably within the range of 10 to 100 kg/$m^3$ and are preferably present in the foams to an extent of more than 80%, particularly preferably to an extent of 95 to 100%.

The polymer matrix of the fire-retardant copolymers, copolymer foams or molding materials preferably consists of thermoplastic (co)polymers or polymer mixtures, in particular styrene (co)polymers. The fire-retardant and expandable styrene (co)polymers (EPS) and styrene (co)polymer extrusion foams (XPS) according to the invention can be processed into expandable granules (EPS) by mixing a blowing agent in the form of a low-boiling organic solvent, such as n-hexane or pentane, into the polymer melt and subsequent extrusion and granulation under pressure or into foam panels (XPS) or foam strands by means of extrusion and expansion using appropriately shaped nozzles.

Expandable styrene (co)polymers (EPS) are understood to mean styrene (co)polymers containing blowing agents. The EPS particle size is preferably within the range of 0.2-2 mm. Styrene (co)polymer particle foams can be obtained by prefoaming and sintering the corresponding, expandable styrene (co)polymers (EPS). The styrene (co)polymer particle foams preferably have 2 to 15 cells per millimeter. Another polymer, in particular a styrene polymer, can also be added to the copolymers according to the invention or to the molding compounds containing the copolymer according to the invention, e.g. homopolystyrene, crystal-clear polystyrene (GPPS), high impact polystyrene (HIPS), styrene-methylstyrene copolymers, acrylonitrile-butadiene-styrene polymers (ABS), poly(styrene-butadiene-styrene) (SBS), styrene-acrylonitrile polymer (SAN), poly(styrene butadiene) rubber (SBR), poly(acrylonitrile styrene acryl ester) (ASA), polystyrene acrylates such as polystyrene methyl acrylate (SMA) and polystyrene methyl methacrylate (SMMA), methyl acrylate butadiene styrene copolymer (MBS), methyl methacrylate acrylonitrile butadiene styrene polymers (MABS), styrene-N-phenylmaleimide copolymers (SPMI) or mixtures thereof or mixtures of the styrene (co)polymers mentioned with polyolefins such as polyethylene or polypropylene and polyphenylene ether (PPE).

Furthermore, a further polymer is also to be understood as meaning a copolymer of styrene and/or phosphorus-containing comonomers, for example copolymers of styrene having at least one of the monomers of formulas (25) to (38).

The molding compounds described are substantially colorless and/or odorless.

In the context of the application, "substantially colorless" is to be understood as meaning the absence of visible colorations. These colorations correspond to the perceived RAL color types, including but not limited to, RAL 1013 Oyster white, 0-RAL 9001 Cream, RAL 9003 Signal white, RAL 9010 Pure white and/or RAL 9016 Traffic white.

Odorless can mean the olfactory perception of sulfide compounds of less than 50 μg/$m^3$ of air, preferably less than 5 μg/$m^3$ of air (e.g. hydrogen sulfide, dimethyl sulfide, methyl mercaptan), particularly preferably less than 0.5 μg/$m^3$ of air (e.g. thiophenol, thiocresol, diphenyl sulfide, propyl mercaptan, ethyl mercaptan, crotyl mercaptan, amyl mercaptan, benzyl mercaptan, amyl mercaptan, allyl mercaptan), wherein the sulfide compounds have a different odor threshold depending on their chemical structure and typically being able to be perceived differently from individual to individual.

To improve the mechanical properties or the temperature resistance, the styrene (co)polymers according to the invention can, optionally using compatibilizers, be added to another polymer as a thermoplastic polymer such as homopolystyrene (PS), polyamides (PA), polyolefins such as polypropylene (PP) or polyethylene (PE), polyacrylates such as polymethylmethacrylate (PMMA), polycarbonate (PC), polyesters such as polyethylene terephthalate (PET) or polybutylene terephthalate (PBT), polyether sulfones (PES), polyether ketones or polyether sulfides (PES). Furthermore, mixtures with other polymers within the quantity ranges mentioned are also possible with, for example, hydrophobically modified or functionalized polymers or oligomers, rubbers such as polyacrylates or polydienes such as styrene-butadiene block copolymers or biodegradable, aliphatic or aliphatic/aromatic copolyesters.

Suitable compatibilizers are, for example, styrene copolymers modified with maleic anhydride, epoxy-containing polymers or organosilanes.

In the production method, the styrene copolymers can also be mixed with polymer recyclates of the thermoplastic polymers mentioned, in particular styrene (co)polymers and expandable styrene (co)polymers (EPS) in amounts of at most 50% by weight, in particular in amounts of 1 to 20% by weight without significantly changing the flame-retardant or self-extinguishing properties of the copolymers and/or molding compounds.

Mixtures of SMA and SAN or SAN and SPMI are preferably used for high-temperature-resistant copolymers and/or molding materials and/or foams. The content is selected according to the desired heat resistance. The acrylonitrile content in SAN is preferably 25 to 33% by weight. The methacrylate content in SMA is preferably 25 to 30% by weight.

The styrene (co)polymers or molding materials may contain auxiliaries and additives, for example flame retardants, fillers, nucleating agents, UV stabilizers, chain transfer agents, blowing agents, plasticizers, antioxidants, soluble and insoluble inorganic and/or organic dyes and pigments, e.g. infrared (IR) absorbers such as carbon black, graphite or aluminum powder. As a rule, the dyes and pigments are added in amounts within the range of 0.01 to 30% by weight, preferably within the range of 1 to 5% by weight. In order to obtain homogeneous and microdispersed distribution of the pigments in the styrene copolymer, it can be expedient, in particular in the case of polar pigments, to use a dispersing agent, e.g. organosilanes, polymers containing epoxy groups or maleic anhydride-grafted styrene polymers. Preferred plasticizers are mineral oils and phthalates, which can be used in amounts of 0.05 to 10% by weight, based on the styrene (co)polymer.

The amount of IR absorbers used depends on their type and effect. The styrene (co)polymer particle foams preferably contain 0.5 to 5% by weight, particularly preferably 1 to 4% by weight, of IR absorbers. Graphite, carbon black or aluminum having an average particle size within the range of 1 to 50 μm are preferably used as IR absorbers.

The graphite used preferably has an average particle size of 1 to 50 μm, in particular from 2.5 μm to 12 μm, a bulk density of 100 to 500 $kg/m^3$ and a specific surface area of 5 to 20 $m^2/g$. Natural graphite or ground, synthetic graphite can be used. The graphite particles are preferably present in the styrene (co)polymer in amounts of 0.05 to 8% by weight, in particular 0.1 to 5% by weight.

The particularly preferred expandable styrene (co)polymers (EPS) or molding materials can be produced by means of various methods.

In one embodiment, athermanous particles and a nonionic surfactant are mixed with a melt of the styrene (co)polymer or molding material, preferably in an extruder. At the same time, the blowing agent is metered into the melt. Athermanous particles are understood to mean particles that are impermeable to infrared radiation (heat radiation).

The athermanous particles can also be incorporated into a melt of styrene (co)polymer or molding material containing a blowing agent, wherein it is expedient to use screened edge fractions of a bead spectrum of blowing agent-containing polystyrene beads formed in a suspension polymerization. The blowing agent and the styrene (co)polymer melts or molded polymer melts containing athermanous particles are pressed out and comminuted to form blowing agent-containing granules. Because the athermanous particles can have a strong nucleating effect, they should be cooled under pressure quickly after pressing in order to avoid foaming. It is therefore expedient to carry out underwater granulation under pressure in a closed system.

It is also possible to add a blowing agent to the styrene (co)polymers or molding materials containing the athermanous particles in a separate method step. Here, the granules are then preferably impregnated with the blowing agent in an aqueous suspension.

In all three cases, the fine, athermanous particles and the nonionic surfactant can be added directly to a styrene (co)polymer melt or molding material melt. However, the athermanous particles can also be added to the melt in the form of a concentrate in polystyrene. Preferably, however, styrene (co)polymer granules and athermanous particles are fed together into an extruder, where the styrene (co)polymer is melted and mixed with the athermanous particles.

The expandable styrene (co)polymers (EPS) are particularly preferably prepared by polymerizing styrene and, optionally, the copolymerizable monomers of the copolymers according to the invention in an aqueous suspension and impregnation with a blowing agent, wherein the polymerization is carried out in the presence of 0.1 to 5% by weight of graphite particles based on the styrene (co) polymer and a nonionic surfactant. Suitable nonionic surfactants are, for example, maleic anhydride copolymers (MA), for example from maleic anhydride and C(20)- to C(24) olefin, polyisobutylene succinic anhydride (PIBSA) or reaction products thereof with hydroxy polyethylene glycol ester, diethylaminoethanol or amines such as tridecylamine, octylamine or polyetheramine, tetraethylenepentamine or mixtures thereof. The molecular weights of the nonionic surfactant are preferably within the range of 500 to 3000 g/mol. They are generally used in amounts ranging from 0.01 to 2% by weight based on the styrene (co) polymer.

The expandable, athermanous particles containing styrene (co)polymers or molding materials can be processed into styrene (co)polymer foams having densities of 5-200 $kg/m^3$, preferably 7 to 100 $kg/m^3$ and in particular 10-80 $kg/m^3$.

For this purpose, the expandable particles are pre-foamed. This is usually done by heating the particles with water vapor in what are referred to as prefoamers. The particles prefoamed in this way are then welded to form molded bodies. For this purpose, the prefoamed particles are placed in non-gastight molds and treated with water vapor. After cooling, the molded parts can be removed.

The foams produced from the expandable copolymers or molding materials according to the invention are distinguished by excellent thermal insulation. This effect is particularly evident at low densities.

The foams or molding materials can be used for thermal insulation of buildings and parts of buildings, for thermal insulation of machines and household appliances, and as packaging materials.

To produce the expandable copolymers, the blowing agent can be mixed into the polymer melt. One possible method comprises the steps of a) melt production, b) mixing, c) cooling, d) conveying and e) granulating. Each of these stages can be carried out by the apparatus or apparatus combinations known in plastics processing.

Static or dynamic mixers, for example extruders, are suitable for mixing. The polymer melt can be taken directly from a polymerization reactor or produced directly in the mixing extruder or a separate melting extruder by melting polymer granules. The melt can be cooled in the mixing units or in separate coolers. For the granulation, for example, pressurized underwater granulation, granulation with rotating blades and cooling by spray nebulization of temperature control liquids or atomization granulation come into consideration. Apparatus arrangements suitable for carrying out the method are, for example:

a) polymerization reactor—static mixer/cooler—granulator
b) polymerization reactor—extruder—granulator
c) extruder—static mixer—granulator
d) extruder—granulator The blowing agent-containing copolymer melt is generally conveyed through the nozzle plate at a temperature within the range of 140 to 300 °C, preferably within the range of 160 to 240 °C. Cooling down to the glass transition temperature range is not necessary.

The nozzle plate is heated to at least the temperature of the blowing agent-containing copolymer melt. The temperature of the nozzle plate is preferably within the range of 20 to 100 °C above the temperature of the blowing agent-containing copolymer melt. This prevents polymer deposits in the nozzles and ensures trouble-free granulation.

In order to obtain marketable granule sizes, the diameter (D) of the nozzle bores at the nozzle outlet should be within the range of 0.2 to 1.5 mm, preferably within the range of 0.3 to 1.2 mm, particularly preferably within the range of 0.3 to 0.8 mm. In this way, granule sizes of less than 2 mm, in particular within the range of 0.4 to 1.4 mm, can be set in a targeted manner even after strand expansion.

A method for producing fire-retardant, expandable copolymers (EPS) that comprises the following steps is particularly preferred:

a) mixing an organic blowing agent into the polymer melt of the copolymers according to the invention and/or mixtures thereof by means of static or dynamic mixers at a temperature of at least 150 °C,
b) cooling the blowing agent copolymer melt to a temperature range of 120 to 200 °C c) discharging through a nozzle plate having holes whose diameter at the nozzle outlet is at most 1.5 mm and
d) granulating the blowing agent-containing melt directly behind the nozzle plate under water at a pressure within the range of 1 to 20 bar.

It is also possible to produce the copolymers and/or molding compounds according to the invention by means of suspension polymerization. In suspension polymerization, styrene, phosphorus-containing comonomers and sulfur are preferably used as monomers. However, up to 50% of its weight can be replaced by other ethylenically unsaturated monomers.

In suspension polymerization, the usual tools, such as peroxide initiators, suspension stabilizers, blowing agents, chain transfer agents, expansion aids, nucleating agents and plasticizers, can be added. Blowing agents are added in amounts of 3 to 10% by weight based on the monomer(s). They can be added to the suspension before, during or after the polymerization. Suitable blowing agents are aliphatic hydrocarbons having 4 to 6 carbon atoms. It is advantageous to use inorganic Pickering dispersants such as magnesium pyrophosphate or calcium phosphate as suspension stabilizers.

The suspension polymerization produces bead-shaped, substantially round particles having an average diameter within the range of 0.2 to 2 mm. To improve processability, the finished, expandable copolymer beads and granules can be coated with customary and known coating agents such as, for example, metal stearates, glycerol esters and fine-particle silicates, antistatic agents or anti-caking agents.

The EPS granules can be mixed with glycerol monostearate (GMS, typically 0.25% by weight), glycerol tristearate (typically 0.25% by weight), fine-particle silica (Aerosil R972, typically 0.12% by weight) and zinc stearate (typically 0.15% by weight) and an antistatic agent.

The expandable copolymer particles can be processed into polystyrene foams having densities of 8 to 200 kg/m$^3$, preferably 10 to 100 kg/m$^3$. For this purpose, the expandable particles are pre-foamed. This is usually done by heating the particles with water vapor in what are referred to as pre-foamers. The particles prefoamed in this way are then welded to form semi-finished products or molded bodies. For this purpose, the prefoamed particles are placed in non-gastight molds and treated with water vapor. After cooling, the molded parts can be removed.

EXAMPLES

Synthesis of the Monomers:

Monomer (25): hexakisallyloxycyclotriphosphazenes (25)

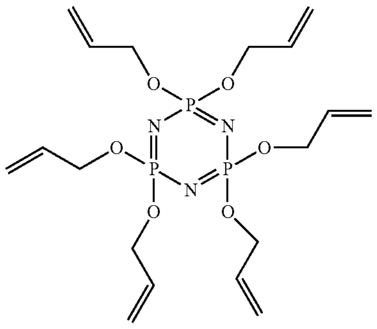

Synthesized according to M. Dutkiewicz et al., Polymer Degradation and Stability 2018, 148, pages 10-18.

Monomer (26): diethyl 2-methacryloyloxy ethyl phosphate (26)

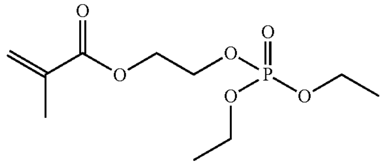

2-Hydroxyethyl methacrylate (929 mg, 7.12 mmol), distilled triethylamine (741 mg, 7.32 mmol) and copper(I) chloride (11.38 mg, 0.11 mmol) were mixed in approx. 10 ml of peroxide-free diethyl ether, deoxygenated and cooled in an ice bath. Diethyl chlorophosphate (1474 mg, 8.54 mmol) dissolved in 4 ml of diethyl ether was added dropwise. The mixture was stirred in an ice bath for 1 hour and at room temperature for 48 hours, then filtered, and the solvent was evaporated.

$^1$H NMR (500 MHz, $CDCl_3$): 1.30 ppm (6 protons, —P—O—$CH_2$—$CH_3$), 1.93 (3 protons, —$CH_3$ acrylate), 4.10 (4 protons, —P—O—$CH_2$—$CH_3$), 4.26 and 4.35 (2 protons each, —O—$CH_2$—$CH_2$—O—), 5.59 and 6.14 (1 proton each, $CH_2$═C—);

Monomer (27): diphenyl 2-methacryloyloxy ethyl phosphate (27)

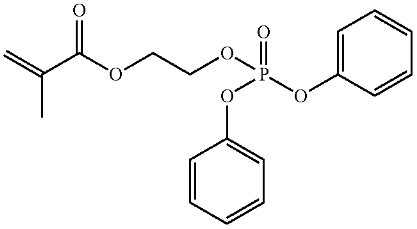

2-Hydroxyethyl methacrylate (929 mg, 7.12 mmol), distilled triethylamine (741 mg, 7.32 mmol) and copper(I) chloride (11.38 mg, 0.11 mmol) were mixed in approx. 10 ml of peroxide-free diethyl ether, deoxygenated and cooled in an ice bath. Diphenyl chlorophosphate (1860 mg, 7.12 mmol) dissolved in 4 ml of diethyl ether was added dropwise. The mixture was stirred in an ice bath for 1 hour and at room temperature for 48 hours, then filtered, and the solvent was evaporated.

$^1$H NMR (500 MHz, $CDCl_3$): 1.91 ppm (3 protons, —$CH_3$ acrylate), 4.38 and 4.48 (2 protons each, —O—$CH_2$—$CH_2$—O—), 5.56 and 6.11 (1 proton each, $CH_2$═C—), 7.22 and 7.33 (10 protons, aromatics)

Monomer (28): diphenyl-2-acryloyloxy-ethyl phosphate (28)

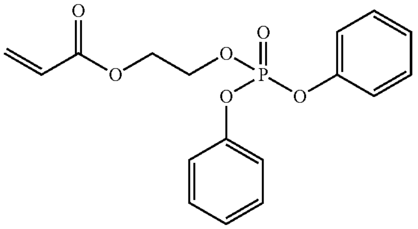

2-Hydroxyethyl acrylate (826 mg, 7.12 mmol), distilled triethylamine (741 mg, 7.32 mmol) and copper(I) chloride (11.38 mg, 0.11 mmol) were mixed in approx. 10 ml of peroxide-free diethyl ether, deoxygenated and cooled in an ice bath. Diphenyl chlorophosphate (1860 mg, 7.12 mmol) dissolved in 4 ml of diethyl ether was added dropwise. The mixture was stirred in an ice bath for 1 hour and at room temperature for 48 hours, then filtered, and the solvent was evaporated.

$^{1}$H NMR (500 MHz, $CDCl_3$): 4.38 and 4.48 (2 protons each ($—O—CH_2—CH_2—O—$), 5.85, 6.08 and 6.41 (1 proton each, $CH_2{=}CH—$), 7.23 and 7.34 (6 and 4 protons, aromatics)

Monomer (29): Diphenyl Methacryloyloxy Butyl Phosphate (29)

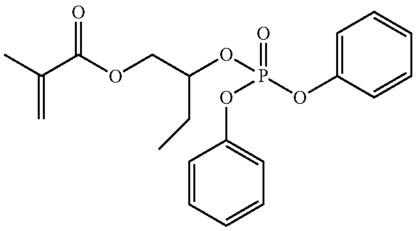

+

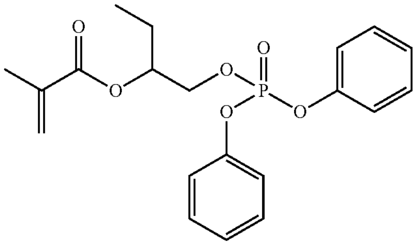

Hydroxybutyl methacrylate (2:1 mixture of isomers) (1125 mg, 7.12 mmol), distilled triethylamine (741 mg, 7.32 mmol) and copper(I) chloride (11.38 mg, 0.11 mmol) were mixed in approx. 10 ml of peroxide-free diethyl ether, deoxygenated and cooled in an ice bath. Diphenyl chlorophosphate (1860 mg, 7.12 mmol) dissolved in 4 ml of diethyl ether was added dropwise. The mixture was stirred in an ice bath for 1 hour and at room temperature for 48 hours, then filtered, and the solvent was evaporated.

1H-NMR (500 MHz, $CDCl_3$), δ (ppm): 0.92/0.96 (t, 6H, $CH_3$); 1.69/1.77 (q, 4H, $CH_2$); 1.90 (s, 6H, $CH_3$); 4.24/4.34 (m, 2H, $—O—CH_2—$); 4.80 (d, 2H, $CH_2$); 5.06 (q, 2H, CH); 5.52 (s, 1H, CH vinyl trans to carbonyl); 6.10 (s, 1H, CH vinyl cis to carbonyl); 7.20/7.32 (aromatics-H).

Monomer (30): diphenyl 4-acryloyloxybutyl phosphate (30)

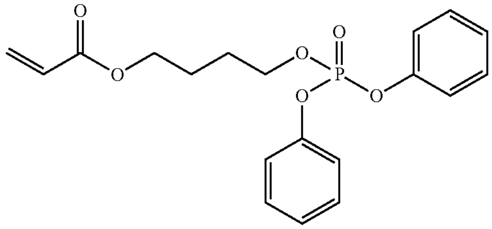

4-Hydroxybutyl acrylate (1025 mg, 7.12 mmol), distilled triethylamine (741 mg, 7.32 mmol) and copper(i) chloride (11.38 mg, 0.11 mmol) were mixed in approx. 10 ml of peroxide-free diethyl ether, deoxygenated and cooled in an ice bath. Diphenyl chlorophosphate (1860 mg, 7.12 mmol) dissolved in 4 ml of diethyl ether was added dropwise. The mixture was stirred in an ice bath for 1 hour and at room temperature for 48 hours, then filtered, and the solvent was evaporated.

$^{1}$H NMR (500 MHz, $CDCl_3$): 1.76 ppm (4 protons, $—O—CH_2\text{-}(CH_2)_2—CH_2—O—$), 4.16 and 4.30 (2 protons each, $—O—CH_2—(CH_2)_2—CH_2—O—$), 5.83, 6.11 and 6.36 (1 proton each, $CH_2{=}CH—$), 7.22 and 7.33 (6+4 protons, aromatics)

Monomer (31): diethyl p-vinylbenzylphosphonate (31)

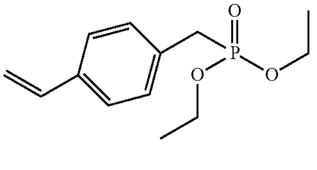

Potassium tert-butanolate (4.4 g, 39.3 mmol) was suspended in THE (40 ml, dry) at 0 °C under inert gas before diethylphosphonate (5.4 g, 39.3 mmol) dissolved in THE (20 ml) was added dropwise. The mixture was stirred for 30 min before being added dropwise at 0 °C to a solution of chloromethylstyrene (3.0 g, 19.7 mmol), TBHQ (2-tert-butylhydroquinone) and TBAI (tetrabutylammonium iodide) in THE (20 ml). After 18 hours at 20 °C under an inert gas, the solids were separated off and the solvent was distilled off.

$^{1}$H NMR ($CDCl_3$, 500 MHz) δ (ppm): 1.21 (t, 6H, $CH_2—CH_3$), 3.16 (d, 2H, $CH_2—P$), 4.02 (m, 4H, $P—O—CH_2$), 5.22/5.73 (d, 2H, $CH{=}CH_2$); 6.68 (dd, 1H, $CH{=}CH_2$); 7.24-7.34 (m, 4H aromatic).

IR ($cm^{-1}$): 3025 (Ar—H), 2850-2953 (alkyl-H), 1600 ($CH_2{=}CH—Ar$); 1512 (C—C, Ar); 1250 (P=O), 1027 (P—O—C); 957 (C=C), 854 (Ar—H).

Monomer (32): diphenyl 2-methacryloyloxy ethylphosphinates (32)

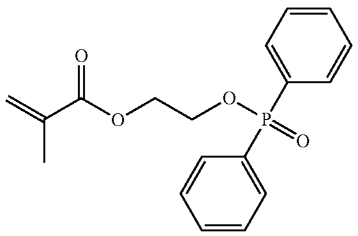

2-Hydroxyethyl methacrylate (2.0 g, 15.5 mmol) was stirred together with triethylamine (1.7 g, 16.5 mmol) and copper(I) chloride (0.06 g) in diethyl ether (20 ml) for 1 hour at 0 °C under inert gas before diphenylphosphinic chloride (3.7 g, 15.8 mmol) dissolved in diethyl ether (5 ml) was added dropwise. After stirring at 20 °C for 24 hours, the triethylammonium chloride was removed and the solvent was distilled off.

$^1$H NMR ($CDCl_3$, 500 MHz) δ (ppm): 1.92 (s, 3H, α-$CH_3$), 4.25 (t, 2H, $CH_2$—O—P), 4.40 (t, 2H, O—$CH_2$—$CH_2$—), 5.58/6.05 (s, 2H, C═$CH_2$), 7.42-7.78 (m, 10H arom).

Monomer (33): dimethyl [(4-ethenylphenyl)methyl]phosphonate (33)

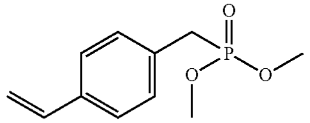

Potassium tert-butanolate (5.0 g, 44.1 mmol) was suspended in THF (40 ml, dry) at 0 °C under inert gas before dimethylphosphonate (4.9 g, 44.1 mmol) dissolved in THE (20 ml) was added dropwise. The mixture was stirred for 30 min before being added dropwise at 0 °C to a solution of chloromethylstyrene (3.4 g, 22.1 mmol), TBHQ (2-tert-butylhydroquinone) and TBAI (tetrabutylammonium iodide) in THE (20 ml). After 18 hours at 20 °C under an inert gas, the solids were separated off and the solvent was distilled off.

$^1$H NMR ($CDCl_3$, 500 MHz) δ (ppm): 3.15 (d, 2H, $CH_2$—P), 3.65 (d, 6H, P—O—$CH_3$), 5.22/5.72 (d, 2H, CH═$CH_2$); 6.66 (dd, 1H, CH═$CH_2$); 7.22-7.34 (m, 4H arom.).

IR ($cm^{-1}$): 3020 (Ar—H), 2850-2953 (alkyl-H), 1600 ($CH_2$═CH—Ar); 1512 (C—C, Ar); 1250 (P═O), 1027 (P—C—C); 957 (C═C), 854 (Ar—H).

Monomer (34): dibutyl [(4-ethenylphenyl)methyl]phosphonate (34)

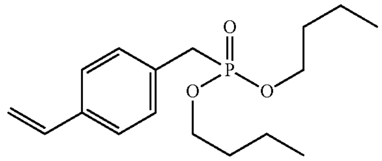

Potassium tert-butanolate (5.0 g, 44.1 mmol) was suspended in THE (40 ml, dry) at 0 °C under inert gas before dibutylphosphonate (8.6 g, 44.1 mmol) dissolved in THE (20 ml) was added dropwise. The mixture was stirred for 30 min before being added dropwise at 0 °C to a solution of chloromethylstyrene (3.4 g, 22.1 mmol), TBHQ (2-tert-butylhydroquinone) and TBAI (tetrabutylammonium iodide) in THE (20 ml). After 18 hours at 20 °C under an inert gas, the solids were separated off and the solvent was distilled off.

$^1$H NMR ($CDCl_3$, 500 MHz) δ (ppm): 0.89 (t, 6H, $CH_3$), 1.34 (sextet, 4H, $CH_2$—$CH_3$), 1.56 (quintet, 4H, $CH_2$—$CH_2$—$CH_3$), 3.16 (d, 2H, $CH_2$—P), 3.93 (m, 4H, P—O—$CH_2$), 5.22/5.74 (d, 2H, CH═$CH_2$); 6.70 (dd, 1H, CH═$CH_2$); 7.24-7.34 (m, 4H arom.).

IR ($cm^{-1}$): 3025 (Ar—H), 2850-2953 (alkyl-H), 1600 ($CH_2$═CH—Ar); 1512 (C—C, Ar); 1250 (P═O), 1027 (P—O—C); 957 (C═C), 854 (Ar—H).

Monomer (35): diethyl 4-acryloyloxy-butyl phosphate (35)

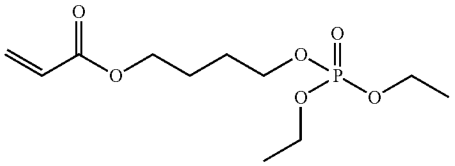

4-Hydroxybutyl acrylate (5.3 g, 37 mmol) was stirred together with triethylamine (3.8 g, 38 mmol) and copper(I) chloride (0.1 g) in diethyl ether (30 ml) for 1 hour at 0 °C under inert gas before diethyl chlorophosphate (6.5 g, 38 mmol) dissolved in diethyl ether (10 ml) was added dropwise. After stirring at 20 °C for 24 hours, the triethylammonium chloride was removed and the solvent was distilled off.

$_1$H NMR (500 MHz, $CDCl_3$), δ (ppm): 1.33 (t, 6H, $CH_3$); 1.78 (q, 4H, $CH_2$); 4.09/4.18 (m, 8H, —O—$CH_2$—); 5.82/6.10/6.37 (3H, $CH_2$═CH—)

Monomer (36): dimethyl-2-methacryloyloxy-ethyl phosphonates (36)

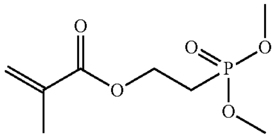

Tosyl chloride (4.3 g, 22.6 mmol), dissolved in dichloromethane (15 ml), was added dropwise to a solution of 2-hydroxyethyl methacrylate (3.0 g, 23.0 mmol), triethylamine (2.5 g, 25 mmol) and 4-(dimethylamino)pyridine (60 mg, 0.5 mmol) in dichloromethane (10 ml) at 0 °C under inert gas while being stirred. After 6 hours, dimethylphosphonate (5.0 g, 45.8 mmol) dissolved in dichloromethane (20 ml) was added dropwise at 20 °C and the mixture was stirred for 18 hours. The solids were separated and the volatiles removed.

$^1$H NMR ($CDCl_3$, 500 MHz) δ (ppm): 1.94 (s, 3H, α-$CH_3$), 3.12 (t, 2H, $CH_2$—P), 3.7-4.30 (s, 6H, P—O—$CH_3$), 5.58/6.05 (s, 2H, CH═$CH_2$).

IR ($cm^{-1}$): 2961 (alkyl-H), 1717 (C═O), 1634 (C═C), 1456 (C—H), 1362 (C—P), 1262 (P═O), 1173 (C—O), 1043 (P—O—C), 977 (C—H).

Monomer (37): diethyl 2-methacryloyloxy ethyl phosphonates (37)

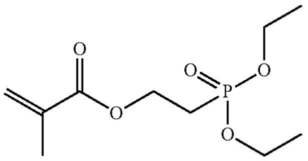

Tosyl chloride (3.8 g, 20.1 mmol), dissolved in dichloromethane (15 ml), was added dropwise to a solution of 2-hydroxyethyl methacrylate (2.7 g, 20.5 mmol), triethylamine (2.1 g, 21 mmol) and 4-(dimethylamino)pyridine (60 mg, 0.5 mmol) in dichloromethane (10 ml) at 0 °C under inert gas while being stirred. After 6 hours, diethylphosphonate (5.6 g, 40.7 mmol) dissolved in dichloromethane (20 ml) was added dropwise at 20 °C and the mixture was stirred for 18 hours. The solids were separated and the volatiles removed.

$^1$H NMR ($CDCl_3$, 500 MHz) δ (ppm): 1.34 (t, 6H, $CH_2$—$CH_3$), 1.94 (s, 3H, α-$CH_3$), 3.19 (t, 2H, $CH_2$—P), 4.12 (q, 4H, P—O—$CH_2$), 5.55/6.02 (s, 2H, CH═$CH_2$).

IR ($cm^{-1}$): 2956 (alkyl-H), 1717 (C═O), 1634 (C═C), 1456 (C—H), 1362 (C—P), 1261 (P═O), 1173 (C—O), 1043 (P—O—C), 977 (C—H).

Monomer (38): dibutyl 2-methacryloyloxy ethyl phosphonates:

(38)

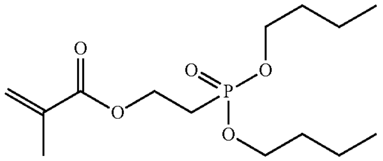

Tosyl chloride (3.2 g, 16.6 mmol), dissolved in dichloromethane (15 ml), was added dropwise to a solution of 2-hydroxyethyl methacrylate (2.1 g, 16.4 mmol), triethylamine (1.7 g, 17 mmol) and 4-(dimethylamino)pyridine (40 mg, 0.3 mmol) in dichloromethane (10 ml) at 0 °C under inert gas while being stirred. After 6 hours, dibutylphosphonate (6.4 g, 33.0 mmol) dissolved in dichloromethane (20 ml) was added dropwise at 20 °C and the mixture was stirred for 18 hours. The solids were separated and the volatiles removed.

$^1$H NMR ($CDCl_3$, 500 MHz) δ (ppm): 0.93 (t, 6H, $CH_3$), 1.39 (sextet, 4H, $CH_2$—$CH_3$), 1.64 (quintet, 4H, $CH_2$—$CH_2$—$CH_3$), 1.95 (s, 3H, α-$CH_3$), 3.09 (m, 2H, $CH_2$—P), 4.05 (m, 4H, PO—$CH_2$), 5.56/6.10 (s, 2H, CH═$CH_2$).

IR ($cm^{-1}$): 2982 (alkyl-H), 1734 (C═O), 1639 (C═C), 1456 (C—H), 1362 (C—P), 1258 (P═O), 1173 (C—O), 1017 (P—O—C), 977 (C—H).

Synthesis of the Copolymers:

Materials Used:

Styrene (99%, Acros Organics/stabilizer removed), sulfur (>99%, Alfa Aesar), divinylbenzene (Merck KGaA, contains 25-50% ethyl styrene), methacrylic acid allyl ester (98%, Sigma Aldrich, stabilized with 50-185 ppm MEHQ), vinylphosphonic acid (97%, Sigma Aldrich), diphenyl(4-vinylphenyl)phosphine (97%, Sigma Aldrich) and the synthesized monomers of formulas (25) to (38) were used for the copolymer synthesis carried out.

With regard to the following copolymer structures (2a) to (24a), the statements regarding the specification of the repeating units for formulas (1) to formula (24) apply analogously. Because of the random distribution of the monomer units within the copolymer, "n" was not specified as a repeating unit.

Copolymer (2): poly(styrene-ran-sulfur)-1

Example 2a (2b)

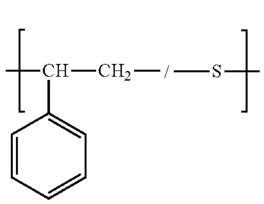

($\omega_{[Sty]}$ = 0.99) ($\omega_{[S]}$ = 0.01)

Synthesis of (2a):

Sulfur (50 mg, 1% by weight) and styrene (4950 mg, 99% by weight) were mixed together and deoxygenated by means of three freeze degassing cycles. The mixture was heated at 130 °C for 72 hours. After dissolving in tetrahydrofuran (THF), the product was isolated by means of precipitation in methanol.

EA: C, (%)=91.6; H, (%)=7.69; S, (%)=0.86;

TGA: $Td_{5\%}$ (°C)=367;

DSC: $T_g$ (°C)=95;

GPC: $M_w$ (kDa)=48; $M_n$ (kDa)=20.

Copolymer (2): Poly(styrene-ran-sulfur)-2

Example (2b)

(2b)

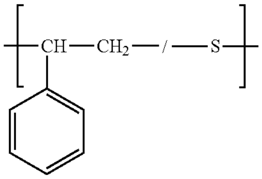

($\omega_{[Sty]}$ = 0.99) ($\omega_{[S]}$ = 0.01)

Synthesis of (2b):

Sulfur (25 mg, 0.5% by weight) and styrene (4975 mg, 99.5% by weight) were mixed together and deoxygenated by means of three freeze degassing cycles. The mixture was heated at 130 °C for 72 hours. After dissolving in THF, the product was isolated by means of precipitation in methanol.

EA: C, (%)=92.0; H, (%)=7.67; S, (%)=0.47;

TGA: $Td_{5\%}$ (°C)=375;

DSC: $T_g$ (°C)=101;

GPC: $M_w$ (kDa)=128; $M_n$ (kDa)=66

Copolymer (2): poly(styrene-ran-sulfur)-3

Example (2c)

(2c)

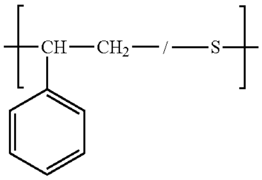

($\omega_{[Sty]}$ = 0.98) ($\omega_{[S]}$ = 0.02)

Synthesis of (2c):

Sulfur (1.4 mg, 2% by weight) and styrene (70 mg, 98% by weight) were mixed together and deoxygenated by means of three freeze degassing cycles. The mixture was heated at 130 °C for 72 hours. After dissolving in tetrahydrofuran (THF), the product was isolated by means of precipitation in methanol.

TGA: $Td_{5\%}$ (°C)=338;

DSC: $T_g$ (°C)=95.8;

GPC (UV detector): $M_w$ (kDa)=18.2; $M_n$ (kDa)=3.4

Copolymer (3): poly(styrene-ran-divinylbenzene-ran-sulfur)

Example (3a)

(3a)

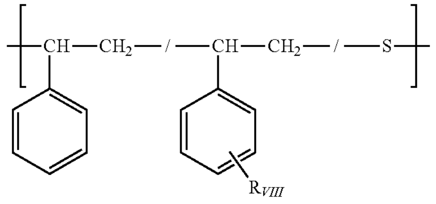

($\omega_{[Sty]}$ = 0.98) ($\omega_{[DVB]}$ = 0.01) ($\omega_{[S]}$ = 0.01)

wherein $R_{VIII}$ comprises
- a polymer according to formula (1) or
- a substituent of the vinyl type, in each case in an ortho, meta or para position relative to the polymer chain.

Synthesis of (3a):

Sulfur (50 mg, 1% by weight), styrene (4900 mg, 98% by weight) and divinylbenzene (50 mg, 1% by weight) were mixed together and deoxygenated by means of three freeze degassing cycles. The mixture was heated at 130 °C for 72 hours. After dissolving in THF, the product was isolated by means of precipitation in methanol.

EA: C, (%)=91.7; H, (%)=8.20;

TGA: $Td_{5\%}$ (°C)=343;

DSC: $T_g$ (°C)=93;

GPC (UV detector): $M_w$ (kDa)=387; $M_n$ (kDa)=18;

Copolymer (4): poly(styrene-ran-hexakisallyloxy-cyclotriphosphazene-ran-sulfur)-1

Example (4a)

(4a)

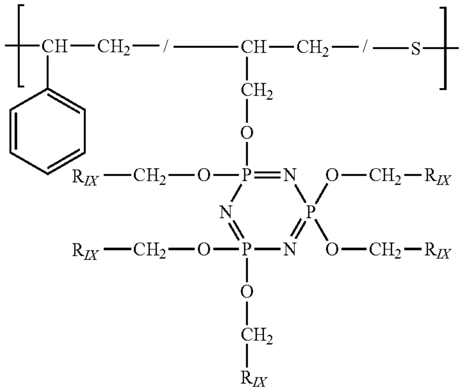

($\omega_{[Sty]}$ = 0.96) ($\omega_{[Allyloxy-CTP]}$ = 0.03) ($\omega_{[S]}$ = 0.01)

$R_{IX}$ are the same or different and comprise
- a polymer according to formula (1) and/or
- a vinyl-type substituent.

Synthesis of (4a):

Sulfur (50 mg, 1% by weight), styrene (4800 mg, 96% by weight) and monomer (25) (150 mg, 3% by weight) were mixed together and deoxygenated by means of three freeze degassing cycles. The mixture was heated at 130 °C for 72 hours. After dissolving in THF, the product was isolated by means of precipitation in methanol.

EA: C, (%)=90.5; H, (%)=8.18; S, (%)=0.23; N, (%)=0.24;

TGA: $Td_{5\%}$ (°C)=304;

DSC: $T_g$ (°C)=82;

GPC (UV detector): $M_w$ (kDa)=70; $M_n$ (kDa)=32.

Example (4b)

(4b)

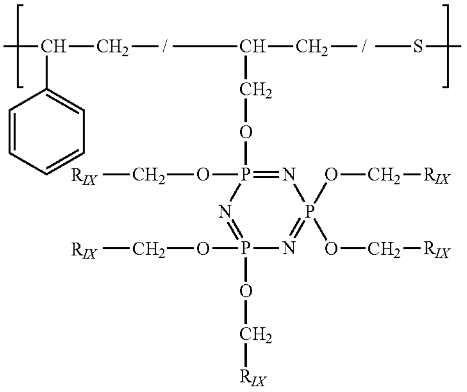

($\omega_{[Sty]}$ = 0.98) ($\omega_{[Allyloxy\text{-}CTP]}$ = 0.01) ($\omega_{[S]}$ = 0.01)

$R_{IX}$ are the same or different and comprise a polymer according to formula (1) and/or a vinyl-type substituent.

Synthesis of (4b):

Sulfur (1.5 g, 1% by weight), styrene (147 g, 98% by weight) and monomer (25) (1.5 g, 1% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=325;

DSC: $T_g$ (°C)=94.5;

GPC (UV detector): $M_w$ (kDa)=47; $M_n$ (kDa)=9.8.

Example (4c)

(4c)

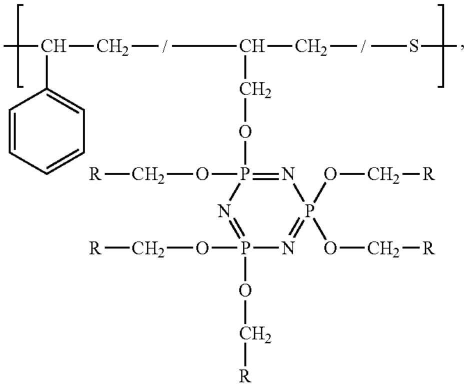

($\omega_{[Sty]}$ = 0.94) ($\omega_{[Allyloxy\text{-}CTP]}$ = 0.05) ($\omega_{[S]}$ = 0.01)

wherein R can be the same or different and comprise a polymer according to formula (1) and/or a vinyl-type substituent.

Synthesis of (4c):

Sulfur (0.5 g, 1% by weight), styrene (47.0 g, 94% by weight) and monomer (25) (2.5 g, 5% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=225;

DSC: $T_g$ (°C)=95.5;

GPC (UV detector): $M_w$ (kDa)=50.9; $M_n$ (kDa)=6300

Copolymer (6): poly(styrene-ran-diethyl-2-methacryloyloxy-ethylphosphate-ran-sulfur)

Example (6a)

(6a)

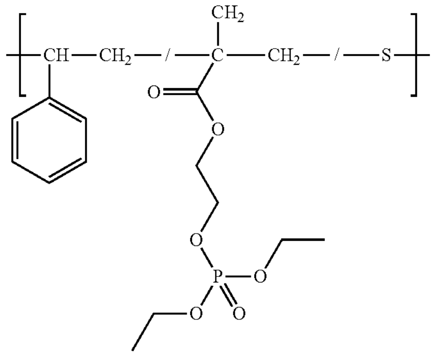

($\omega_{[Sty]}$ = 0.98) ($\omega_{[P]}$ = 0.01) ($\omega_{[S]}$ = 0.01)

Synthesis of (6a):

Sulfur (310 mg, 1% by weight), styrene (30.98 g, 98% by weight) and monomer (26) (320 mg, 1% by weight) were mixed together and deoxygenated by means of three freeze degassing cycles. The mixture was heated at 130 °C for 72 hours. After dissolving in THF, the product was isolated by means of precipitation in methanol.

EA: C, 90.9%, H, 8.4%, S 0.2%;

TGA: $Td_{5\%}$: 405 °C

DCS: $T_g$: 90.3 °C

GPC (UV detector): $M_n$ 32 kDa; $M_w$ 62 kDa.

Compound (6a) has particularly good flame-retardant properties. This is due to the presence of a high molecular weight alongside the phosphorus-containing monomer unit.

Copolymer (7): poly(styrene-ran-diphenyl-2-methacryloyloxy-ethylphosphate-ran-sulfur)

Example (7a)

(7a)

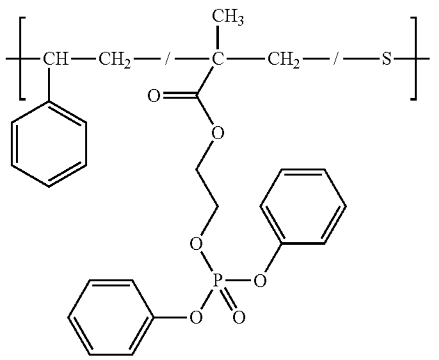

($\omega_{[Sty]}$ = 0.98) ($\omega_{[P]}$ = 0.01) ($\omega_{[S]}$ = 0.01)

Compound (7a) has particularly good flame-retardant properties. This is due to the presence of a high molecular weight alongside the phosphorus-containing monomer unit.

Synthesis of (7a):

Sulfur (1.5 g, 1% by weight), styrene (147 g, 98% by weight) and monomer (27) (1.5 g, 1% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=325;

DSC: $T_g$ (°C)=96.7;

GPC (UV detector): $M_w$ (kDa)=46; $M_n$ (kDa)=10.

Copolymer (8): poly(styrene-ran-diphenyl-2-acryloyloxy-ethylphosphate-ran-sulfur)

Example (8a)

(8a)

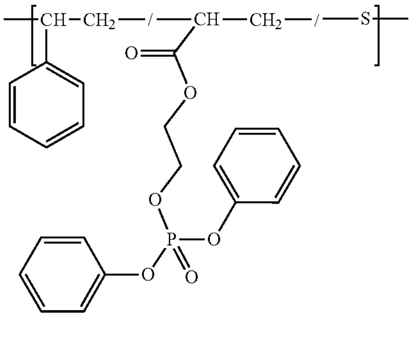

($\omega_{[Sty]}$ = 0.98) ($\omega_{[P]}$ = 0.01) ($\omega_{[S]}$ = 0.01)

Synthesis of (8a):

Sulfur (1.5 g, 1% by weight), styrene (147 g, 98% by weight) and monomer (28) (1.5 g, 1% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=325;

DSC: $T_g$ (°C)=94.2;

GPC (UV detector): $M_w$ (kDa)=46; $M_n$ (kDa)=11.8.

Compound (8a) has particularly good flame-retardant properties. This is due to the presence of a high molecular weight alongside the phosphorus-containing monomer unit.

Example (8b)

(8b)

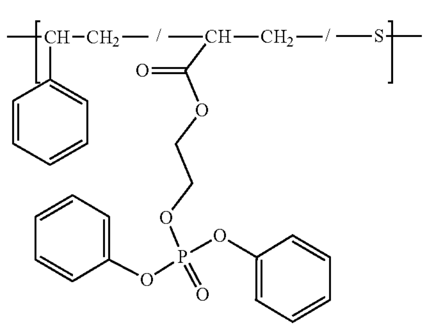

($\omega_{[Sty]}$ = 0.94) ($\omega_{[P]}$ = 0.05) ($\omega_{[S]}$ = 0.01)

Synthesis of (8b):

Sulfur (1.6 g, 1% by weight), styrene (138.4 g, 94% by weight) and monomer (28) (10.0 g, 5% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=350;

DSC: $T_g$ (°C)=96.8;

GPC (UV detector): $M_w$ (kDa)=49.5; $M_n$ (kDa)=7.3

Copolymer (9): poly(styrene-ran-diphenyl-methacryloyloxy-n-butylphosphate-ran-sulfur)

Example (9a)

(9a)

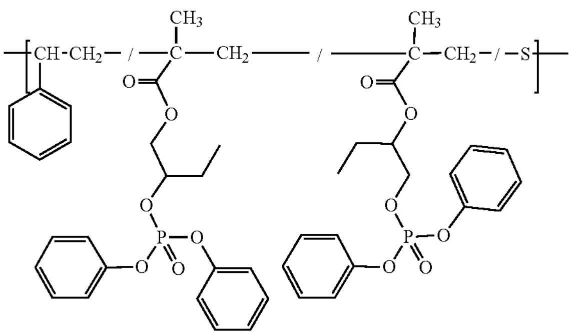

($\omega_{[Sty]}$ = 0.98) ($\omega_{[P]}$ = 0.007) ($\omega_{[P]}$ = 0.003) ($\omega_{[S]}$ = 0.01)

Synthesis of (9a):

Sulfur (1.5 g, 1% by weight), styrene (147 g, 98% by weight) and monomer (29) (1.5 g, 1% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=290;

DSC: $T_g$ (°C)=83.4;

GPC: $M_w$ (kDa)=40; $M_n$ (kDa)=13.3.

Copolymer (10): poly(styrene-ran-diphenyl-4-acryloyloxy-butylphosphate-ran-sulfur)

Example (10a)

(10a)

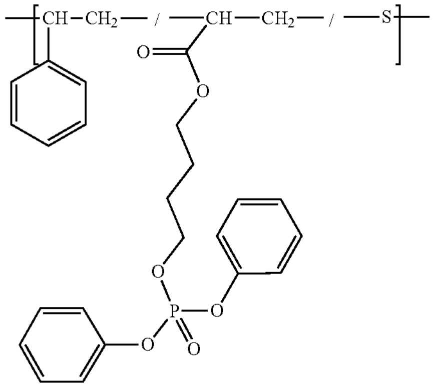

($\omega_{[Sty]}$ = 0.98) ($\omega_{[P]}$ = 0.01) ($\omega_{[S]}$ = 0.01)

Synthesis of (10a):

Sulfur (1.5 g, 1% by weight), styrene (147 g, 98% by weight) and monomer (30) (1.5 g, 1% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=325;

DSC: $T_g$ (°C)=93.5;

GPC (UV detector): Mw (kDa)=51; Mn (kDa)=12.1.

Copolymer (11): poly(styrene-ran-diphenyl-2-methacryloyloxy-ethylphosphinate-ran-sulfur)

Example (11a)

(11a)

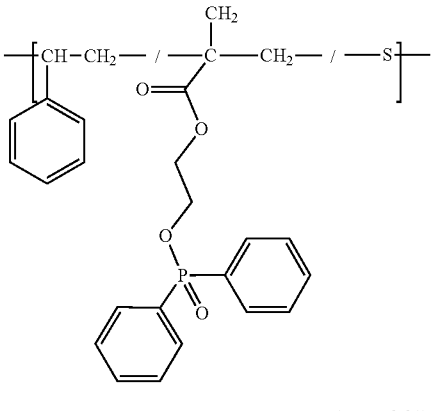

($\omega_{[Sty]}$ = 0.98) ($\omega_{[P]}$ = 0.01) ($\omega_{[S]}$ = 0.01)

Synthesis of (11a):

Sulfur (0.1 g, 1% by weight), styrene (9.8 g, 98% by weight) and monomer (32) (0.1 g, 1% by weight) were mixed together and deoxygenated by means of three freeze degassing cycles. The mixtures were heated at 130 °C for 72 hours. After dissolving in THF, the product was isolated by means of precipitation in methanol.

GPC (UV detector): $M_w$ (kDa)=34.0; $M_n$ (kDa)=3.3

Copolymer (14): poly(styrene-ran-diethyl p-vinylbenzylphosphonate-ran-sulfur)

Example (14a)

(14a)

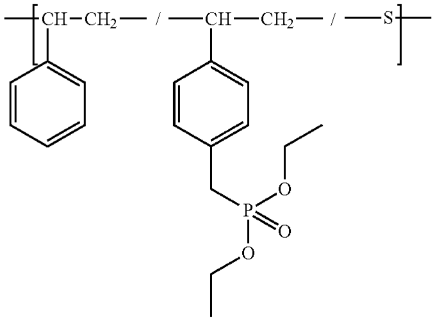

($\omega_{[Sty]}$ = 0.98) ($\omega_{[P]}$ = 0.01) ($\omega_{[S]}$ = 0.01)

Synthesis of (14a):

Sulfur (0.1 g, 1% by weight), styrene (9.8 g, 98% by weight) and monomer (31) (0.1 g, 1% by weight) were mixed together and deoxygenated by means of three freeze degassing cycles. The mixtures were heated at 130 °C for 72 hours. After dissolving in THF, the product was isolated by means of precipitation in methanol.

GPC (UV detector): $M_w$ (kDa)=14.6; $M_n$ (kDa)=2.5

Copolymer (16): poly(styrene-ran-allyl-methacrylate-ran-sulfur)

Example (16a)

(16a)

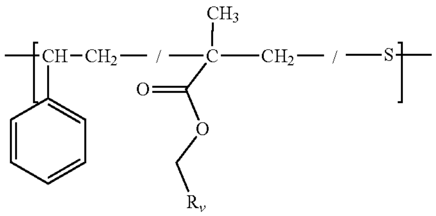

($\omega_{[Sty]}$ = 1-$\omega_{[AMA]}$-$\omega_{[S]}$) = >0 to <1 ($\omega_{[AMA]}$ = 0 to <1) ($\omega_{[S]}$ = >0 to <0.4)

wherein $\omega_{[AMA]}$ corresponds to the mass fraction of the allyl methacrylate and RV means consisting of vinyl or a covalent bond to a further polymer of the formula (1).

Synthesis of (16):

Sulfur (0.01 g, 1% by weight), styrene (0.98 g, 98% by weight) allyl methacrylate (0.01 g, 1% by weight) and azodiisobutyronitrile (AIBN, 0.07 g) were mixed together and deoxygenated by means of three freeze degassing cycles. The mixture was heated at 80 °C for 4 hours. After dissolving in THF, the product was isolated by means of precipitation in methanol.

GPC (UV detector): Mw (kDa)=22; Mn (kDa)=6

Copolymer (17): poly(styrene-ran-diethyl-4-methacryloyloxy-butylphosphate-ran-sulfur)

Example (17a)

(17a)

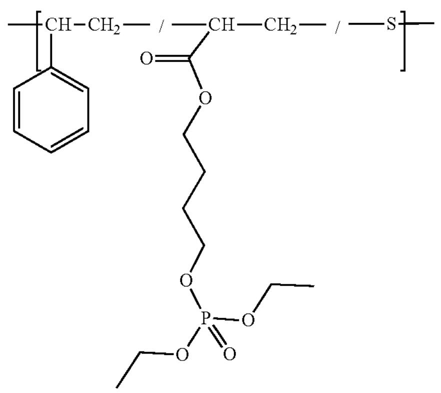

$(\omega_{[Sty]} = 0.98)$ $(\omega_{[P]} = 0.01)$ $(\omega_{[S]} = 0.01)$

Synthesis of (17a):

Sulfur (0.01 g, 1% by weight), styrene (0.98 g, 98% by weight) and monomer (35) (0.01 g, 1% by weight) were mixed together and deoxygenated by means of three freeze degassing cycles. The mixtures were heated at 130 °C for 72 hours. After dissolving in THF, the product was isolated by means of precipitation in methanol.

TGA: $Td_{5\%}$ (°C)=325;

DSC: $T_g$ (°C)=97.9;

GPC (UV detector): Mw (kDa)=25.8; Mn (kDa)=5.3

Copolymer (18): poly(styrene-ran-2-methacryloyloxy-methylphosphonate-ran-sulfur)

Example 18a (18a)

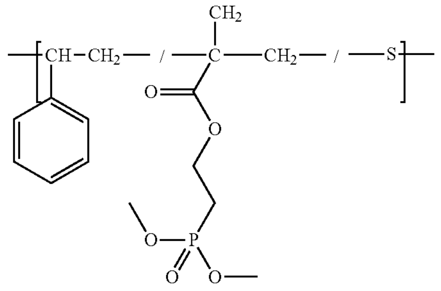

$(\omega_{[Sty]} = 0.98)$ $(\omega_{[P]} = 0.01)$ $(\omega_{[S]} = 0.01)$

Synthesis of (18a):

Sulfur (0.01 g, 1% by weight), styrene (0.98 g, 98% by weight), monomer (36) (0.01 g, 1% by weight) and azodiisobutyronitrile (AIBN, 70 mg, 5 mol % on styrene) were mixed together and deoxygenated by three freeze degassing cycles. The mixture was heated at 80 °C for 40 hours. After dissolving in THF, the product was isolated by means of precipitation in methanol.

10 GPC (UV detector): Mw (kDa)=16.2; Mn (kDa)=3.9; IR (P═O, 1247 cm-1): detectable Copolymer (19): poly(styrene-ran-2-methacryloyloxy-methylphosphonate-ran-sulfur)

Example (19a)

(19a)

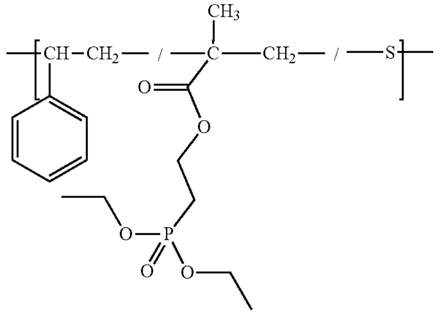

$(\omega_{[Sty]} = 0.98)$ $(\omega_{[P]} = 0.01)$ $(\omega_{[S]} = 0.01)$

Synthesis of (19a):

Sulfur (0.01 g, 1% by weight), styrene (0.98 g, 98% by weight), monomer (37) (0.01 g, 1% by weight) and azodiisobutyronitrile (AIBN, 70 mg, 5 mol % on styrene) were mixed together and deoxygenated by three freeze degassing cycles. The mixture was heated at 80 °C for 40 hours. After dissolving in THF, the product was isolated by means of precipitation in methanol.

GPC (UV detector): Mw (kDa)=8.7; Mn (kDa)=2.9;

IR (P═O, 1247 5 $cm^{-1}$): detectable

Copolymer (20): poly(styrene-ran-2-methacryloyloxy-butylphosphonate-ran-sulfur)

Example (20a)

(20a)

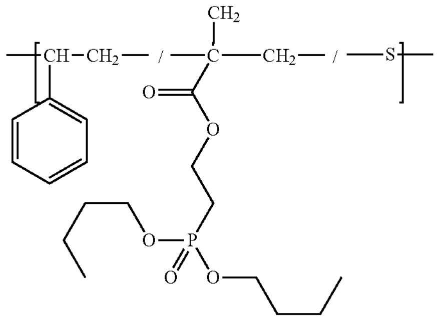

$(\omega_{[Sty]} = 0.98)$ $(\omega_{[P]} = 0.01)$ $(\omega_{[S]} = 0.01)$

Synthesis of (20a):

Sulfur (0.01 g, 1% by weight), styrene (0.98 g, 98% by weight), monomer (38) (0.01 g, 1% by weight) and azodiisobutyronitrile (AIBN, 70 mg, 5 mol % on styrene) were mixed together and deoxygenated by means of three freeze degassing cycles. The mixture was heated at 80 °C for 40 hours. After dissolving in THF, the product was isolated by means of precipitation in methanol.

GPC (UV detector): Mw (kDa)=13.8; Mn (kDa)=3.6;

Copolymer (21): poly(styrene-ran-dimethyl [(4-ethenylphenyl)methyl]phosphonate-ran-sulfur)

Example (21a)

(21a)

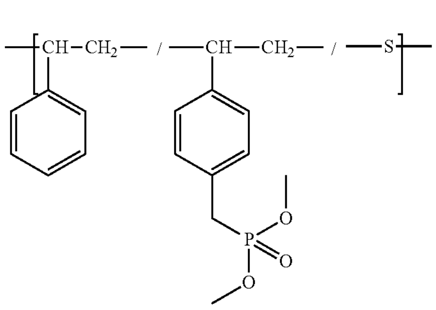

($\omega_{[Sty]}$ = 0.98) ($\omega_{[P]}$ = 0.01) ($\omega_{[S]}$ = 0.01)

Synthesis of (21a):

Sulfur (0.01 g, 1% by weight), styrene (0.98 g, 98% by weight), monomer (33) (0.01 g, 1% by weight) and azodiisobutyronitrile (AIBN, 70 mg, 5 mol % on styrene) were mixed together and deoxygenated by three freeze degassing cycles. The mixture was heated at 80 °C for 40 hours. After dissolving in THF, the product was isolated by means of precipitation in methanol.

GPC (UV detector): Mw (kDa)=6.0; Mn (kDa)=3.6

IR (P═O, 1247 cm-1): detectable

Copolymer (22): poly(styrene-ran-dibutyl[(4-ethenylphenyl)methyl]phosphonate-ran-sulfur)

Example (22a)

(22a)

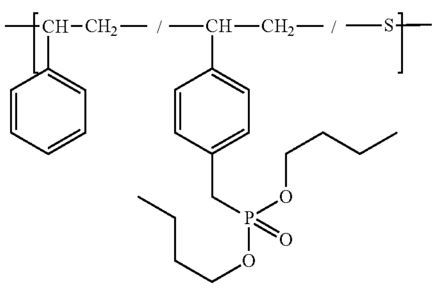

($\omega_{[Sty]}$ = 0.98) ($\omega_{[P]}$ = 0.01) ($\omega_{[S]}$ = 0.01)

Synthesis of (22a):

Sulfur (0.01 g, 1% by weight), styrene (0.98 g, 98% by weight), monomer (34) (0.01 g, 1% by weight) and azodiisobutyronitrile (AIBN, 15.6 mg, 5 mol % on styrene) were mixed together and deoxygenated by means of three freeze degassing cycles. The mixture was heated at 80 °C for 40 hours. After dissolving in THF, the product was isolated by means of precipitation in methanol.

GPC (UV detector): Mw (kDa)=15.0; Mn (kDa)=3.0

IR (P═O, 1247 $cm^{-1}$): detectable

Copolymer (23): poly(styrene-ran-vinylphosphonic acid-ran-sulfur)

Example (23a)

(23a)

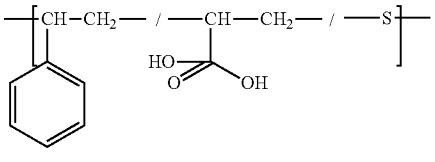

($\omega_{[Sty]}$= 1 - $\omega_{[P]}$-$\omega_{[S]}$) = >0 to <1 ($\omega_{[P]}$ = 0 to <1) ($\omega_{[S]}$ = >0 to <0.4)

Synthesis of (23a):

Sulfur (0.2 g, 1% by weight), styrene (19.6 g, 98% by weight), vinylphosphonic acid (0.2 g, 1% by weight) and azodiisobutyronitrile (AIBN, 1.3 g, 5 mol % on styrene) were mixed together and deoxygenated by means of three freeze degassing cycles. The mixture was heated at 80 °C for 15 hours. After dissolving in THF, the product was isolated by means of precipitation in methanol.

GPC (UV detector): Mw (kDa)=28.7; Mn (kDa)=7.7

Copolymer (24): poly(styrene-ran-diphenyl(4-vinylphenyl)phosphine-ran-sulfur)

Example (24a)

(24a)

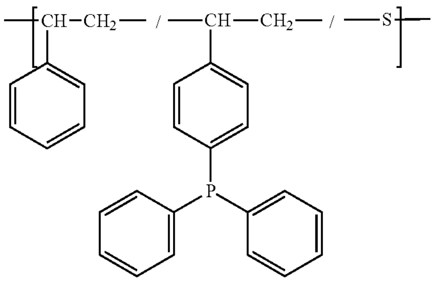

($\omega_{[Sty]}$= 1 - $\omega_{[P]}$-$\omega_{[S]}$) = >0 to <1 ($\omega_{[P]}$ = 0 to <1) ($\omega_{[S]}$ = >0 to <0.4)

Synthesis of (24a):

Sulfur (0.2 g, 1% by weight), styrene (19.6 g, 98% by weight), diphenylphosphinostyrene (0.2 g, 1% by weight) and azodiisobutyronitrile (AIBN, 1.3 g, 5 mol % on styrene) were mixed together and deoxygenated by means of three freeze degassing cycles. The mixture was heated at 80 °C for 15 hours. After dissolving in THF, the product was isolated by means of precipitation in methanol.

GPC (UV detector): Mw (kDa)=17.9; Mn (kDa)=6.9

Production of Fire-Retardant Molding Compounds

Polymers and Additives Used for Producing Fire-Retardant Molding Materials or Compounds:

| Polymer/additive | Type and manufacturer | Abbreviation |
|---|---|---|
| polystyrene | polystyrene 158K, BASF SE, Ludwigshafen, Germany | PS |
| 2,4,8,10-tetraoxa-3,9-diphosphaspiro [5.5] undecane-3,9-dimethyl-3,9-dioxides | aflammite PCO 900, Thor GmbH, Speyer, Germany | P1 |
| hexakisphenoxycyclotriphosphazenes | abcr GmbH, Karlsruhe ,Germany | P2 |

Production of the Foam Body for Fire Testing

VB1:

First, 20 g of PS were dissolved in dichloromethane. The solution was then poured into a 20 cm×10 cm aluminum mold and dried at room temperature (RT) for 24 hours. The dried polymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

VB2:

First, 20 g PS and 0.5 g P1 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

VB3:

First, 20 g PS and 0.95 g P2 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB1:

First, 20 g (2a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB2:

First, 20 g (2a) and 0.95 g P2 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB3:

First, 20 g (2b) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB4:

First, 20 g (2b) and 0.5 g P1 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB5:

First, 20 g (3a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB6:

First, 20 g (4a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB7:

First, 20 g (4b) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB8:

First, 20 g (6a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB9:

First, 20 g (7a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB10:

First, 20 g (8a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB11:

First, 20 g (9a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB12:

First, 20 g (10a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB13:

First, 20 g (14a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB14: First, 20 g (11a) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB15: First, 20 g (2c) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB16: First, 20 g (4c) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

EB17: First, 20 g (8b) were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50 °C. The resulting test bodies have a density of approx. 70 kg/$m^3$.

Carrying Out the Fire Tests

Screening Test:

A 5 cm×10 cm×1 cm strip of the foam body is held for a few seconds in a 2 cm high propane gas flame having an energy of approx. 50 kW. As soon as the sample ignites, but after a maximum of 5 seconds, it is pulled out of the flame and the ignitability and self-extinguishing of the sample are recorded. Flame-retardant means that, after an initial ignition, the copolymer bodies or molding compounds have shorter afterburn times compared to homopolystyrene.

Self-extinguishing is understood to mean the following behavior in the screening test: The specimen made of copolymers or molding compounds ignited by the flame of the burner extinguishes within 5 seconds after the burner flame has been removed from the specimen.

Fire Test According to DIN 4102-2 (B2):

A 20 cm×10 cm×1 cm sample is exposed to a flame having an energy of approx. 50 kW and a flame height of 2 cm at a vertical distance of 1 cm from the underside of the sample for 15 seconds. The afterburn time, flame height, self-extinguishing and burning dripping behavior of the sample are noted.

Elemental Analysis (EA):

The elemental composition of the copolymers was measured using a vario MICRO cube (Elementar Analysesysteme GmbH, Langenselbold). The measurement method was calibrated with sulfanilamide.

Gel Permeation Chromatography (GPC):

The molecular weight and the molecular weight distribution of the samples were measured with a GPC analysis system from Shimadzu (Kyoto, Japan) consisting of a degasser (DGU-20$A_{3R}$), two pumps (LC-20AD), an autosampler (SIL-20$A_{HT}$), a column oven (CTO-20A, 30 °C), a diode array detector (SPD-M20A, 30 °C), a refractive index detector (RID-20A, 30 °C), a control unit (CBM-20A) and a column set (PSS Polymer Standard Services GmbH, Mainz—a pre-column SDV 50×8 mm, 5 μm, two separation columns SDV 300×8 mm, 5 μm, 1000 Å, one separation column SDV 300×8 mm, 5 μm, 100,000 Å). Calibration was performed using polystyrene standards.

Melt Viscosity:

The melt viscosity was measured using the MeltFloW basic plus (Karg Industrietechnik, Krailing) in accordance with ISO 1133.

Foam Quality:

Various aspects were taken into account when assessing the foam quality: (a) cellularity of the polymer foams (size and uniformity of the cells). The foam bodies were tested and classified according to the following criteria:

-- Large cells (>5 mm) highly irregular;

- Large cells (>5 mm) irregular;

0 Medium-sized cells (5 mm-1 mm) irregular;

+ Small cells (<1 mm) irregular;

++ Small cells (<1 mm) regular.

(b) phase separation and formation of agglomerates. The foam bodies were tested and classified according to the following criteria:

0 >10 agglomerates and phase separations per foam body;

+ >0-<10 agglomerates and phase separations per foam body;

++ No agglomerates and phase separations per foam body.

"The assessment of the quality of the foam bodies, the elemental composition, the molecular weights and distributions, and the thermal characteristics of the synthesized copolymers are shown in Tables 1, 2, and 3 below. The fire test results according to DIN 4102-2 (B2) are compiled in Tables 4 (screening test) and 5 (small burner test).

TABLE 1

| Assessment of foam body quality | | |
|---|---|---|
| Sample | (a) cellularity | (b) phase separation and agglomerates |
| (2a) | 0 | + |
| (2b) | 0 | + |
| (3a) | 0 | 0 |
| (4a) | 0 | 0 |
| (4b) | 0 | 0 |
| (6a) | ++ | ++ |
| (7a) | ++ | ++ |
| (8a) | ++ | ++ |
| (9a) | ++ | + |
| (10a) | ++ | + |
| (14a) | ++ | ++ |

TABLE 2

| Elemental composition of the synthesized copolymers: | | | | |
|---|---|---|---|---|
| Sample | C (%)[1] | H (%)[1] | S (%)[1] | N (%)[1] |
| (2a) | 91.6 | 7.69 | 0.86 | 0.00 |
| (2b) | 92.0 | 7.67 | 0.47 | 0.00 |
| (3a) | 91.7 | 8.20 | 0.00 | 0.00 |
| (4a) | 90.5 | 8.18 | 0.23 | 0.24 |
| (6a) | 90.9 | 8.40 | 0.20 | 0.00 |

[1]percentage-based elementary composition determined by means of elemental analysis,

TABLE 3

| Molecular weights and distributions, thermal characteristics and viscosity of the copolymers: | | | | | |
|---|---|---|---|---|---|
| Sample | Mn[1] (kDa) | Mw[1] (kDa) | Đ[1] | $Td_{5\%}$[2] (° C.) | Tg[3] (° C.) |
| (2a) | 20 | 48 | 2.36 | 367 | 95 |
| (2b) | 66 | 128 | 1.93 | 375 | 101 |
| (3a) | 18 | 387 | 21.5 | 343 | 93 |
| (4a) | 32 | 70 | 2.19 | 304 | 82 |
| (4b) | 9.8 | 47 | 4.80 | 325 | 94.5 |
| (6a) | 32 | 62 | 1.94 | 405 | 90 |
| (7a) | 10 | 46 | 4.60 | 325 | 96.7 |
| (8a) | 11.8 | 46 | 3.90 | 325 | 94.2 |
| (9a) | 13.3 | 40 | 3.08 | 290 | 83.4 |
| (10a) | 12.1 | 51 | 4.21 | 325 | 93.5 |

[1]average molecular weights and their molecular weight distribution determined by means of GPC,
[2]decomposition temperature at 5% mass loss determined by means of TGA,
[3]onset of glass transition temperature determined by means of DSC.

TABLE 4

| Fire test results: screening test according to DIN 4102-2 (B2): | | | | |
|---|---|---|---|---|
| Example | Composition | Content of (co)polymer (phr[1]) | Content of P1 or P2 (phr[1]) | Self-extinguishing (yes/no) |
| VB1 | PS | 100 | — | no |
| VB2 | PS + P1 | 100 | 2.50 | no |
| VB3 | PS + P2 | 100 | 4.75 | no |
| EB1 | (2a) | 100 | — | yes |
| EB2 | (2a) + P2 | 100 | 4.75 | yes |
| EB3 | (2b) | 100 | — | no |
| EB4 | (2b) + P1 | 100 | 2.50 | yes |
| EB5 | (3a) | 100 | — | no |
| EB6 | (4a) | 100 | — | yes |

TABLE 4-continued

| Fire test results: screening test according to DIN 4102-2 (B2): | | | | |
|---|---|---|---|---|
| Example | Composition | Content of (co)polymer (phr[1]) | Content of P1 or P2 (phr[1]) | Self-extinguishing (yes/no) |
| EP7 | (4b) | 100 | — | yes |
| EB8 | (6a) | 100 | — | yes |
| EB9 | (7a) | 100 | — | yes |
| EB10 | (8a) | 100 | — | yes |
| EB11 | (9a) | 100 | — | yes |
| EB12 | (10a) | 100 | — | yes |
| EB13 | (14a) | 100 | — | yes |
| EB14 | (11a) | 100 | — | yes |

[1]parts per hundred rubber

TABLE 5

| Small burner test according to DIN 4102-2 (B2): | | | | | |
|---|---|---|---|---|---|
| Example | Composition | Content of (co)polymer (phr[1]) | Content of P1 or P2 (phr[1]) | Flame height (cm) | Afterburn time (s) |
| VB1 | PS | 100 | — | >15 | 31 |
| VB2 | PS + P1 | 100 | 2.50 | >15 | 35 |
| VB3 | PS + P2 | 100 | 4.75 | >15 | 22 |
| EB2 | (2a) + P2 | 100 | 4.75 | 9 | 0 |
| EB5 | (3a) | 100 | — | >15 | 23 |
| EB6 | (4a) | 100 | — | 12 | 12.8 |
| EB15 | (2c) | 100 | — | 10 | 3 |
| EB16 | (4c) | 100 | — | 10 | 5.5 |
| EB8 | (6a) | 100 | — | 11 | 13 |
| EB10 | (8a) | 100 | — | 8 | 5 |
| EB17 | (8b) | 100 | — | 9 | 3 |
| EB12 | (10a) | 100 | — | 6 | 0 |

[1]parts per hundred rubber

The invention claimed is:

1. A fire-retardant copolymer comprising a formula selected from the group consisting of formulas (6), (7), (8), (9), (10), (11), (12), (13), (14), (15), (17), (18), (19), (20), (21), (22), (23), and (24), wherein the copolymer contains covalently bonded phosphorous compounds, a $\omega_{[S]}$ in a range of >0 to <0.4, a $\omega_{[Sty]}$ in a range of >0 to <1, wherein $\omega_{[Sty]}=1-\omega_{[P]}- \ldots -\omega_{[S]}$ or $\omega_{[Sty]}=1-\omega_{[P]}-\omega_{[S]}$, and wherein:

(6)

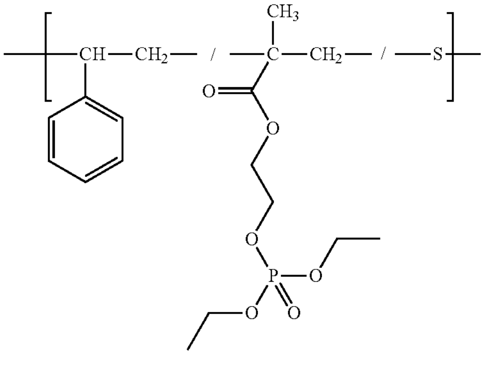
,

-continued
(7)
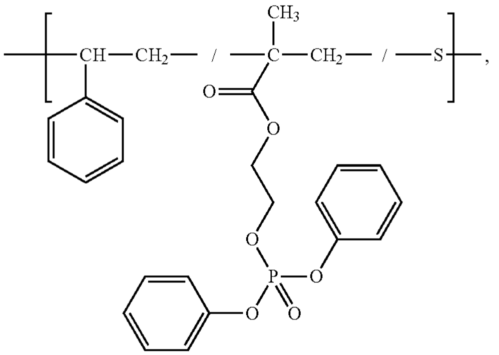
(8)
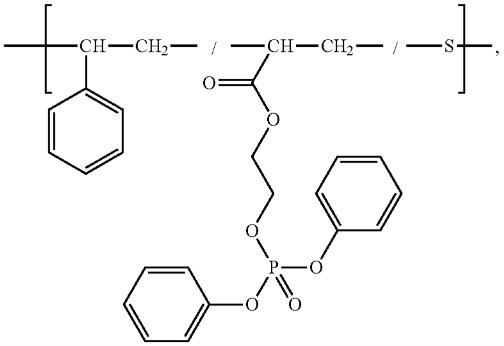
(9)
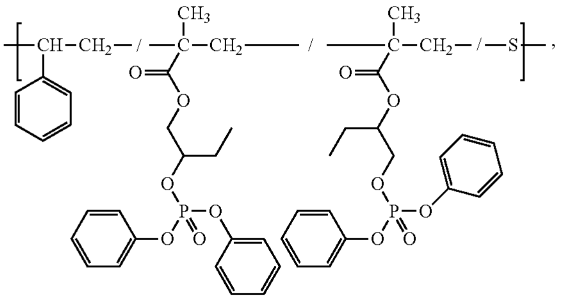
(10)
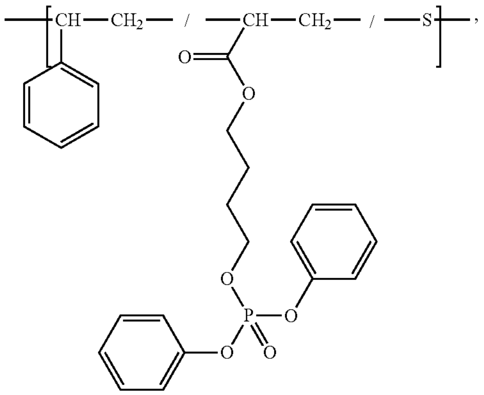
-continued
(11)
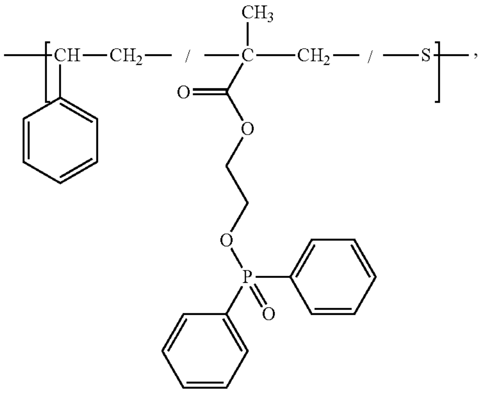
(12)
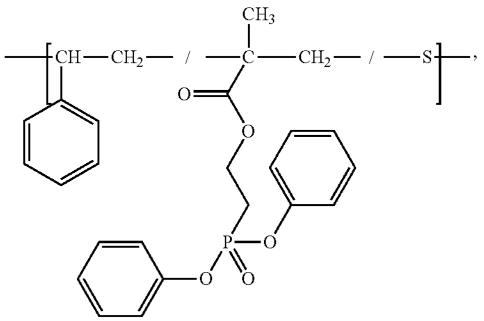
(13)
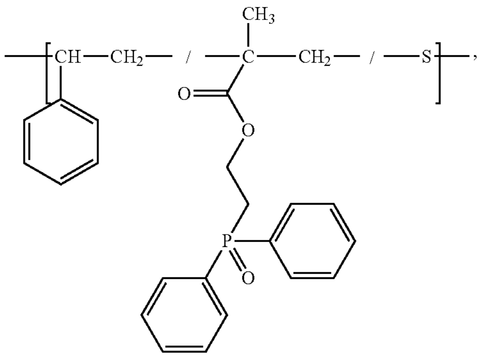
(14)
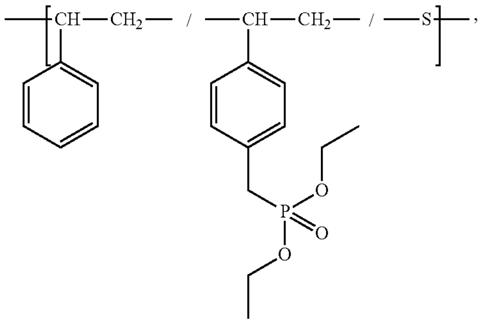

-continued (15)

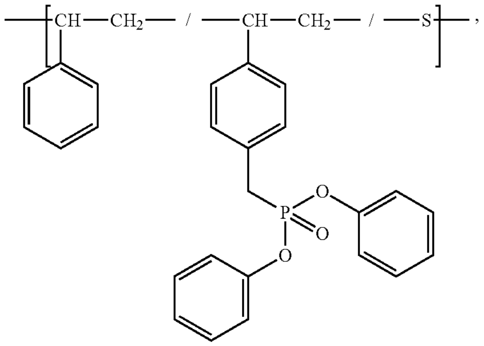

(17)

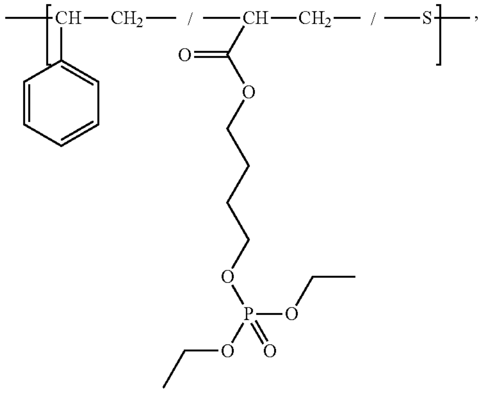

(18)

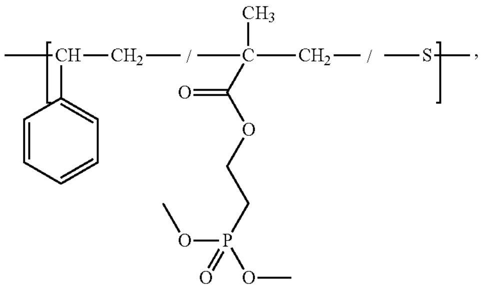

(19)

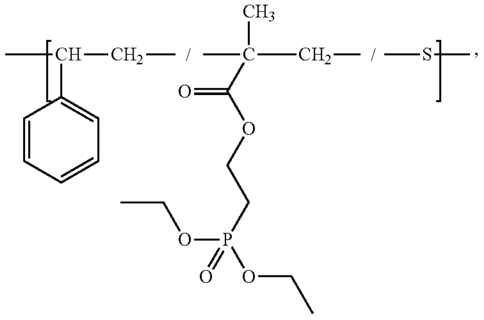

-continued (20)

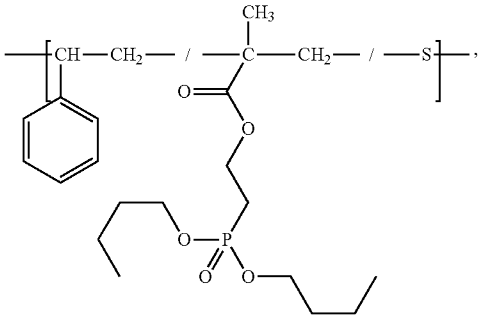

(21)

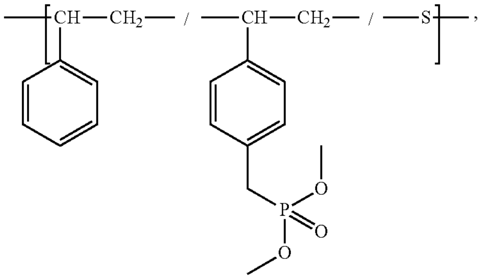

(22)

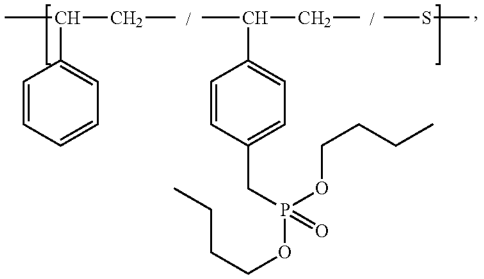

(23)

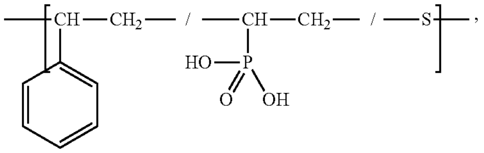

and (24)

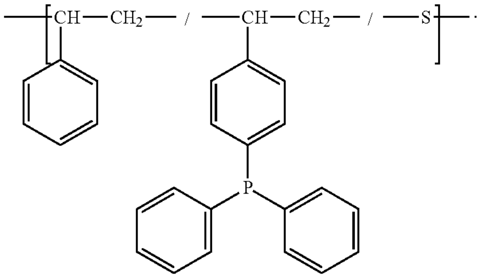

2. The fire-retardant copolymer according to claim 1, wherein the copolymer is colorless, wherein the copolymer is determined to be colorless by comparing the copolymer to one or more color selected from the group consisting of RAL 1013 Oyster white, RAL 9001 Cream, RAL 9003 Signal white, RAL 9010 Pure white, and RAL 9016 Traffic white.

3. The fire-retardant copolymer according to claim 1, wherein the copolymer is odorless within a detection limit of sulfide compounds, wherein the detection limit of sulfide compounds is within a range of less than 50 μg/$m^3$ of air.

4. The fire-retardant copolymer according to claim 1, wherein the copolymer has shorter afterburn times after initial ignition compared to homopolystyrene.

5. The fire-retardant copolymer according to claim 2, wherein the copolymer is extinguished within 5s after ignition.

6. The fire-retardant copolymer according to claim 1, wherein the formula is formula (10) and the copolymer extinguishes immediately after ignition.

7. A fire-retardant molding material comprising:

a first fire-retardant copolymer; and an additional compound, wherein the additional compound is selected from the group consisting of a polymer, a second fire-retardant copolymer, and a material;

wherein the first fire-retardant copolymer comprises a formula selected from the group consisting of formulas (6), (7), (8), (9), (10), (11), (12), (13), (14), (15), (17), (18), (19), (20), (21), (22), (23), and (24), wherein the first fire-retardant copolymer contains covalently bonded phosphorous compounds, a $\omega_{[S]}$ in a range of $>0$ to $<0.4$, a $\omega_{[Sty]}$ in a range of $>0$ to $<1$, wherein $\omega_{[Sty]}=1-\omega_{[P]}-\ldots-\omega_{[S]}$ or $\omega_{[Sty]}=1-\omega_{[P]}-\omega_{[S]}$, and wherein:

(6)

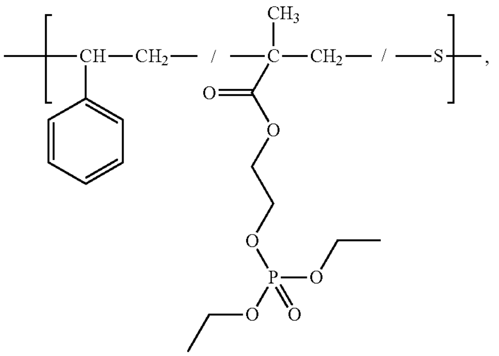

(7)

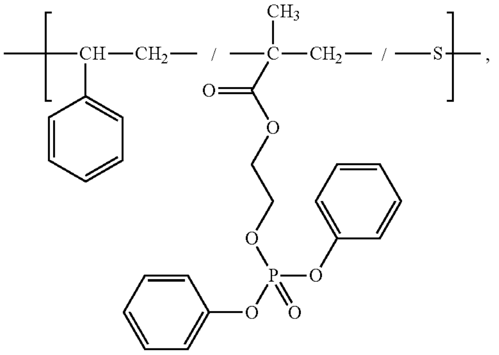

(8)

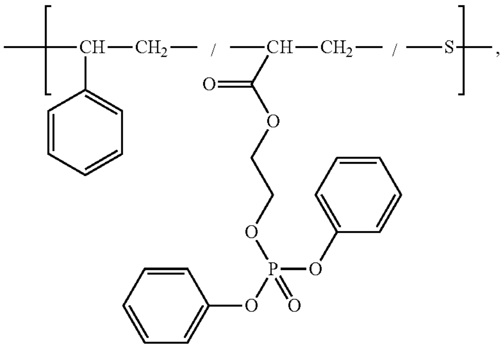

-continued (9)

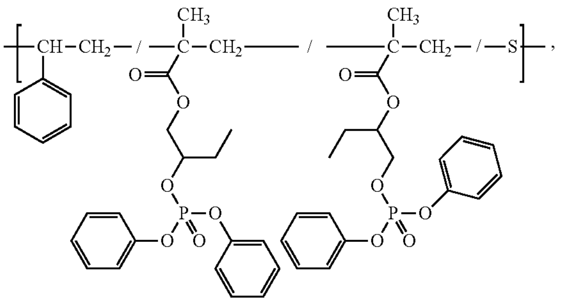

(10)

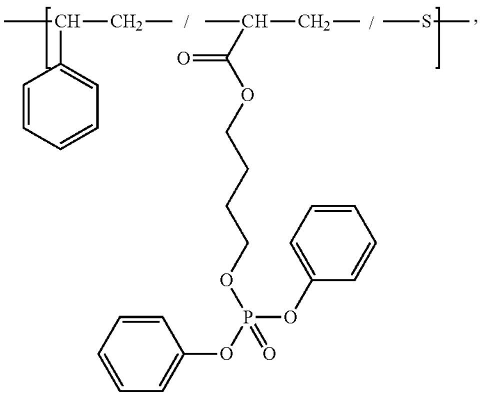

(11)

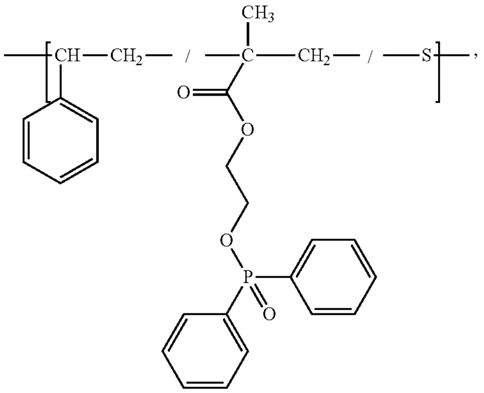

(12)

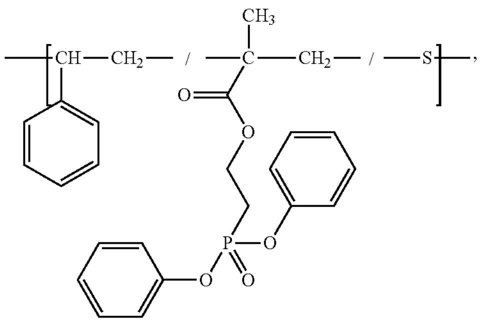

-continued
(13)
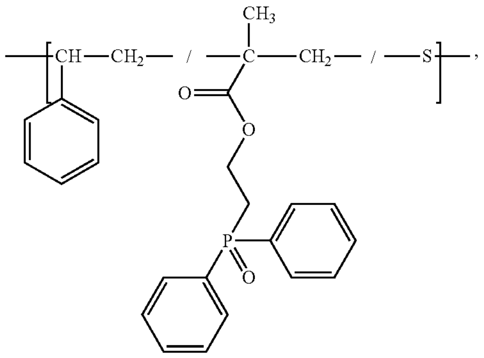
(14)
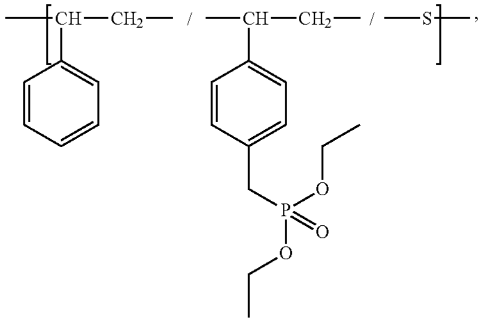
(15)
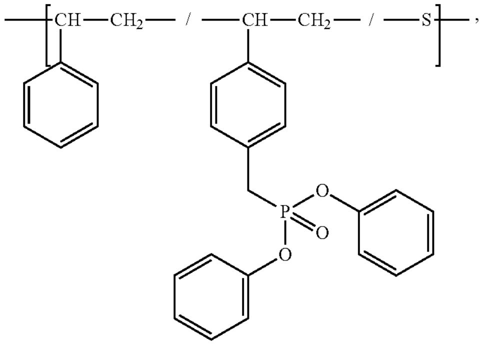
(17)
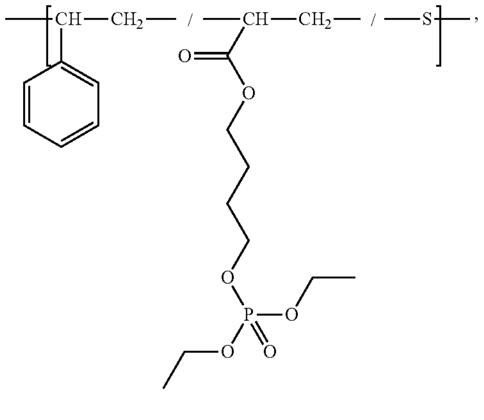
-continued
(18)
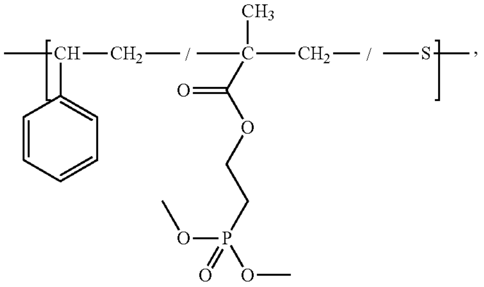
(19)
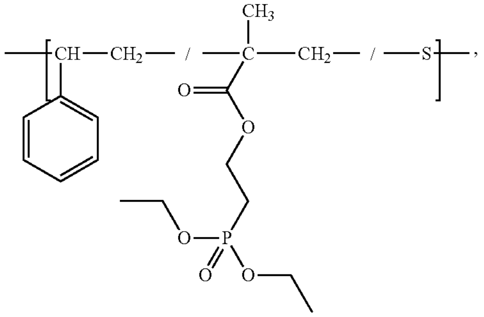
(20)
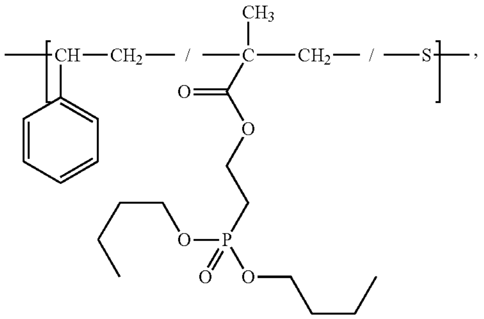
(21)
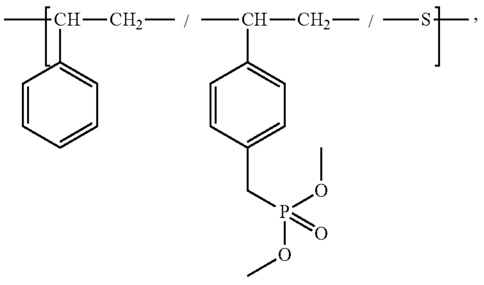
(22)
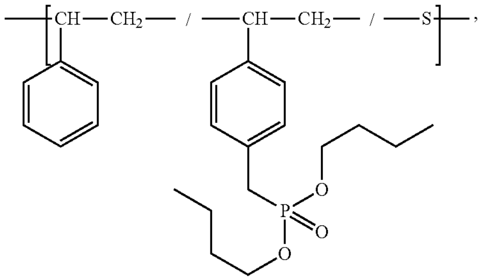

-continued (23)

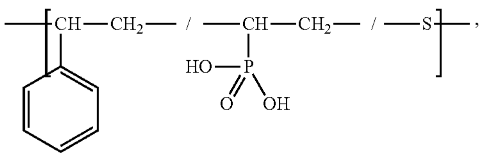

, and (24)

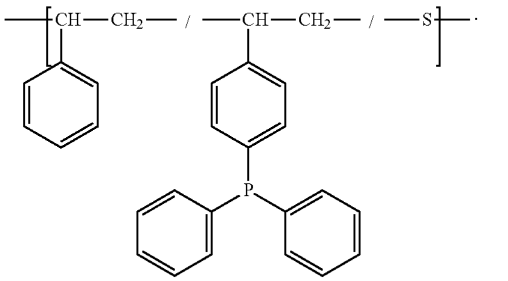

8. The fire-retardant molding material according to claim 7, wherein the copolymer content is more than 10% by weight of the molding material.

9. The fire-retardant molding material according to claim 7, wherein the additional compound is the second fire-retardant copolymer and the second fire-retardant copolymer comprises a formula selected from the group consisting of formulas (6), (7), (8), (9), (10), (11), (12), (13), (14), (15), (17), (18), (19), (20), (21), (22), (23), and (24); and wherein the second fire-retardant copolymer is different than the first fire-retardant copolymer.

10. The fire-retardant molding material according to claim 7, wherein the additional compound is a material selected from the group consisting of metal, plastic, prepregs, carbon and ceramics.

11. The fire-retardant molding material according to claim 7, wherein the additional compound is a polymer selected from the group consisting of homopolymeric polystyrenes (PS), expandable styrene polymers (EPS), and extruded foam sheets (XPS).

12. The fire-retardant molding material according to claim 10, wherein the additional compound is graphite.

13. The fire-retardant molding material according to claim 10, wherein the additional compound is a material selected from the group consisting of melamine polyphosphate, melamine cyanurate, metal oxides, metal hydroxides, cyclotriphosphazenes, phosphates, phosphinates, phosphine oxides, hypophosphites, and expanded graphite.

14. The fire-retardant molding material according to claim 7, wherein the additional compound is the material and the material is selected from the group consisting of 8,10-tetraoxa-3,9-diphosphaspiro [5.5] undecane-3,9-dimethyl-3, 9-dioxide in a range of 0.1-10% by weight and hexakisphenoxycyclotriphosphazene in a range of 0.5-20% by weight.

15. The fire-retardant molding material according to claim 7, wherein the molding material has shorter afterburn times after initial ignition compared to homopolystyrene.

16. The fire-retardant molding material according to claim 7, wherein the molding material is extinguished within 5 s after ignition.

17. The fire-retardant molding material according to claim 7, wherein the molding material is colorless, wherein the molding material is determined to be colorless by comparing the molding material to one or more color selected from the group consisting of RAL 1013 Oyster white, RAL 9001 Cream, and RAL 9003 Signal white, RAL 9010 Pure white and RAL 9016 Traffic white.

18. The fire-retardant molding material according to claim 7, wherein the molding material is odorless within a detection limit of sulfide compounds, wherein the detection limit of sulfide compounds is within a range of less than 50 μg/$m^3$ of air.

19. The fire-retardant molding material according to claim 10, wherein the material contains graphite as a carbon material for IR-Absorption.

20. The fire-retardant molding material according to claim 10, wherein the material contains aluminum having an average particle size within a range of 1 to 50 μm.

21. A method for producing a fire-retardant copolymer comprising a. mixing an organic blowing agent into a polymer melt by means of static and/or dynamic mixers at a temperature of at least 150 °C, thereby obtaining a blowing agent-containing polymer melt;

b. cooling the blowing agent-containing polymer melt to a temperature of at least 120 °C;

c. discharging the blowing agent-containing polymer melt through a nozzle plate having holes whose diameter at a nozzle outlet is at most 1.5 mm; and d. granulating the blowing agent-containing polymer melt directly behind the nozzle plate under water at a pressure within a range of 1 to 20 bar;

wherein the organic blowing agent comprises a low-boiling organic solvent; and wherein the polymer melt comprises one of:

(6)

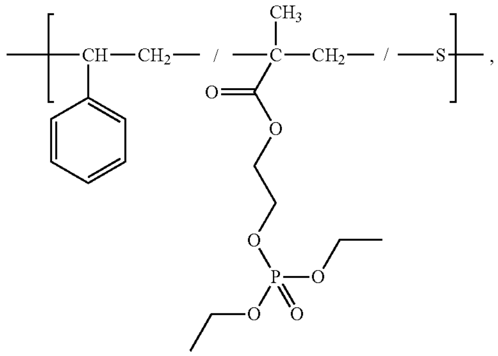

(7)

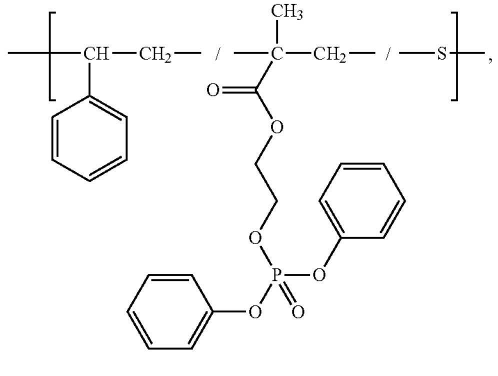

-continued
(8)
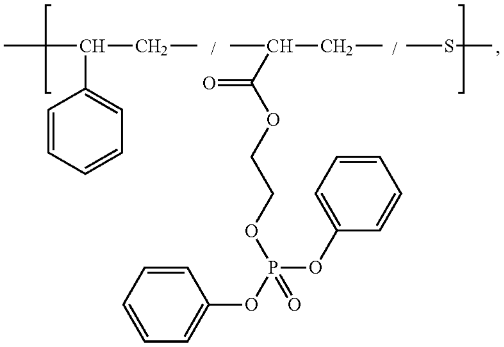
(9)
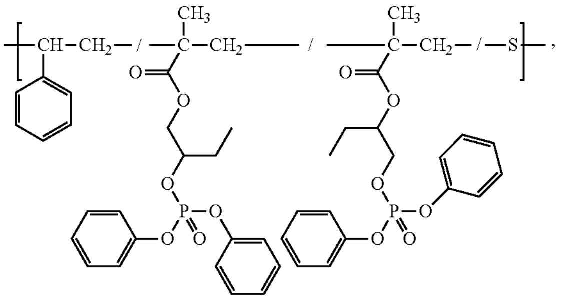
(10)
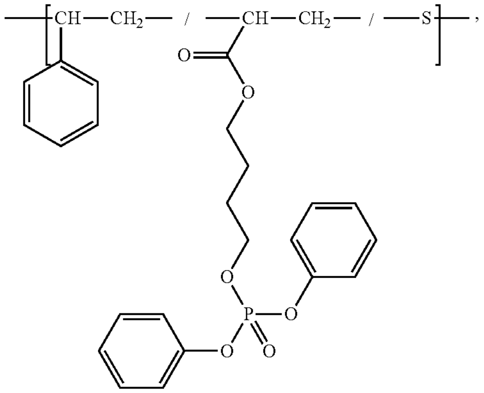
(11)
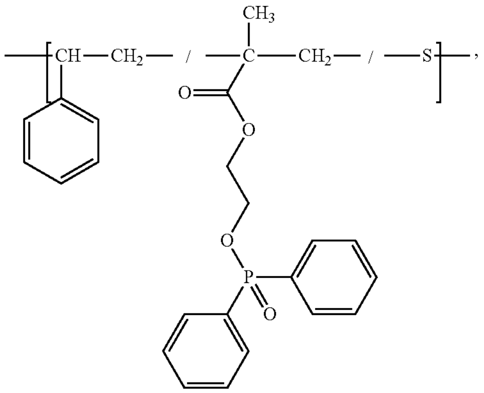
-continued
(12)
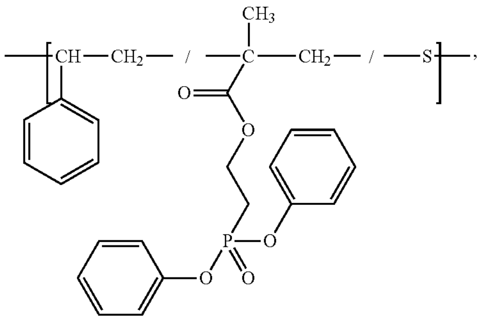
(13)
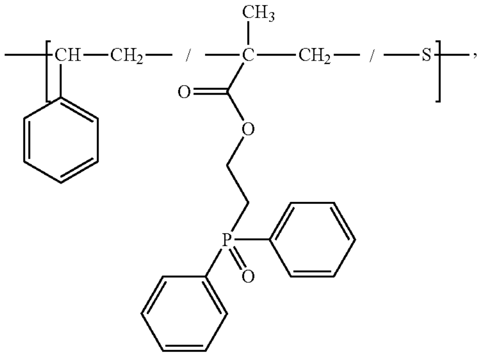
(14)
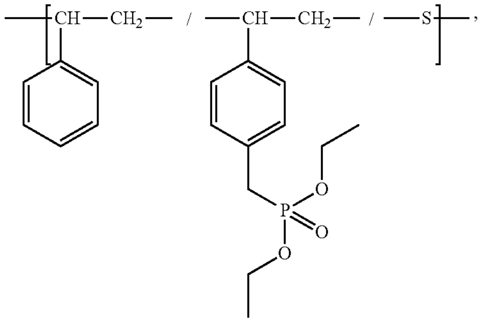
(15)
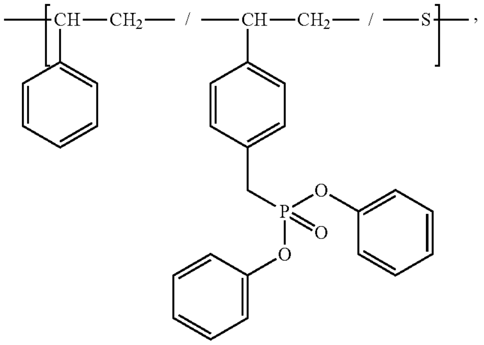

-continued (17)

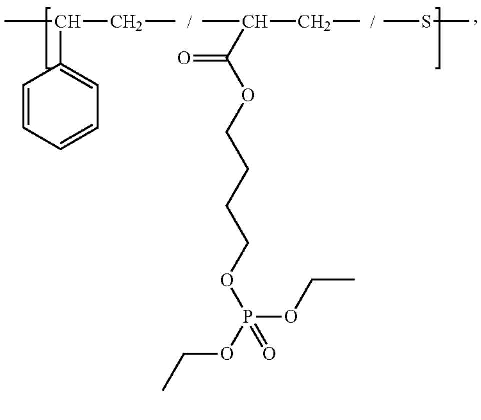

(18)

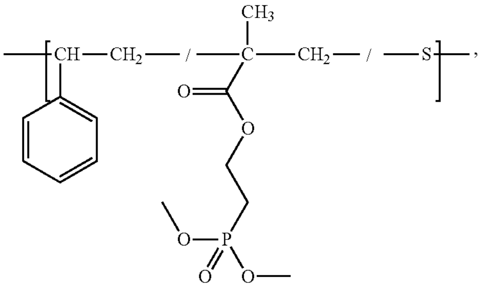

(19)

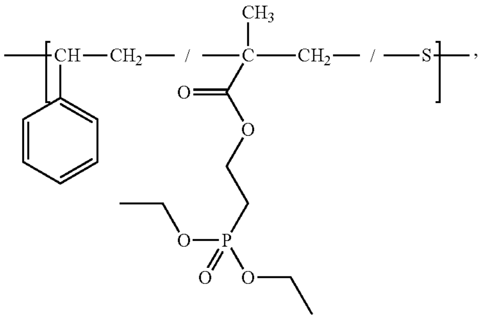

(20)

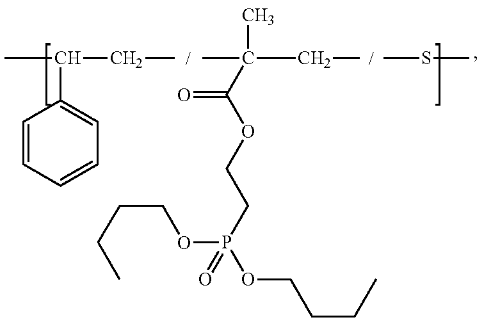

-continued (21)

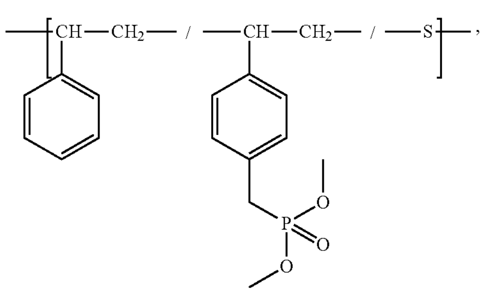

(22)

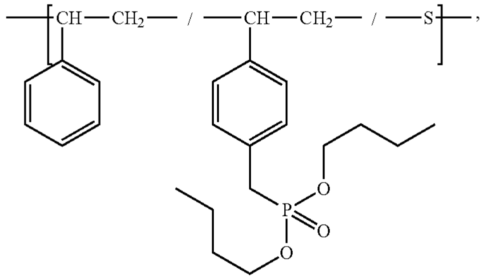

(23)

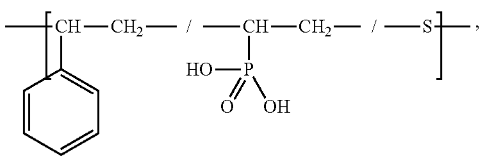

, and (24)

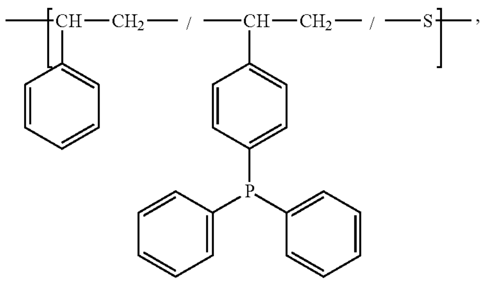

wherein the fire-retardant copolymer contains covalently bonded phosphorus compounds, a $\omega_{[S]}$ in a range of >0 to <0.4, a $\omega_{[Sty]}$ in a range of >0 to <1, wherein $\omega_{[Sty]}=1-\omega_{[P]}- \ldots -\omega_{[S]}$ or $\omega_{[Sty]}=1-\omega_{[P]}-\omega_{[S]}$; and wherein the fire-retardant copolymer optionally comprises one or more additive, wherein the one or more additive is selected from the group consisting of melamine, melamine polyphosphate, melamine cyanurate, metal oxides, metal hydroxides, cyclotriphosphazenes, phosphates, phosphinates, phosphine oxides, hypophosphites, and expanded graphite.

22. A method for producing a fire-retardant copolymers comprising a. polymerizing styrene with copolymerizable monomers in an aqueous suspension in the presence of 0.1 to 5% by weight of graphite particles based on styrene and a nonionic surfactant, thereby obtaining a copolymer, wherein the copolymerizable monomers have a formula selected from the group consisting of formulas (6), (7), (8), (9), (10), (11), (12), (13), (14), (15), (17), (18), (19), (20), (21), (22), (23), and (24);

b. impregnating the copolymer with a blowing agent, thereby obtaining a blowing agent-containing copolymer;
c. adding an organic blowing agent before, during, and/or after polymerizing, wherein the organic blowing agent comprises a low-boiling organic solvent; and
d. separating the blowing agent-containing copolymer by means of sieving; and
wherein:
(6)
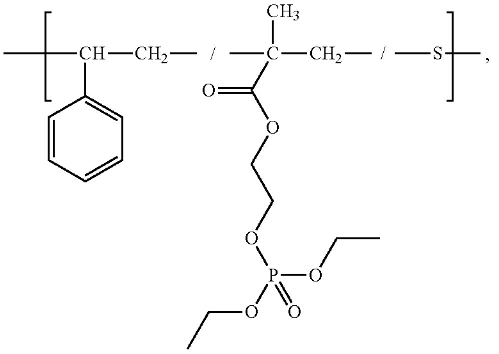
(7)
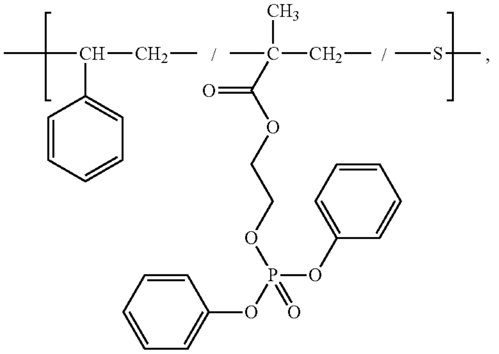
(8)
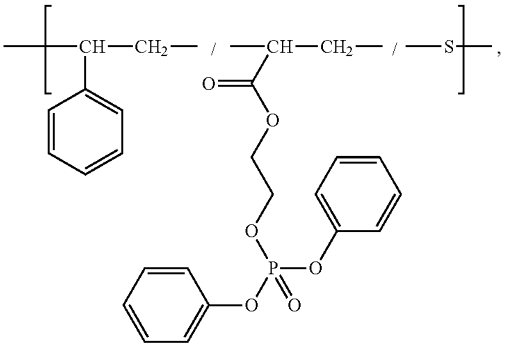
(9)
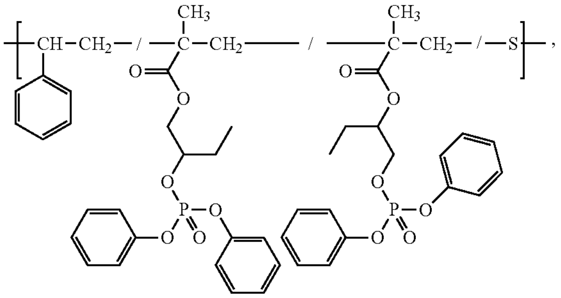
-continued
(10)
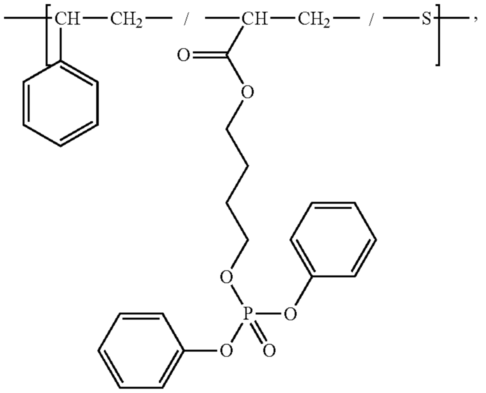
(11)
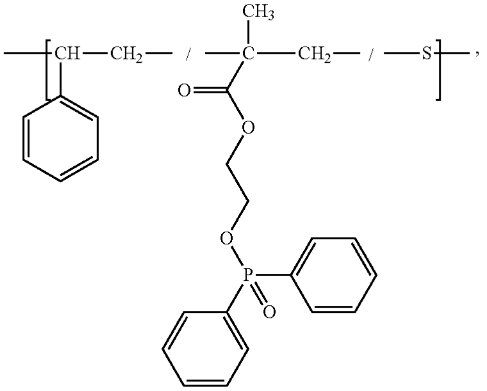
(12)
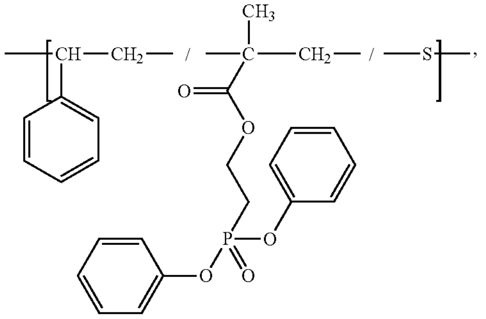
(13)
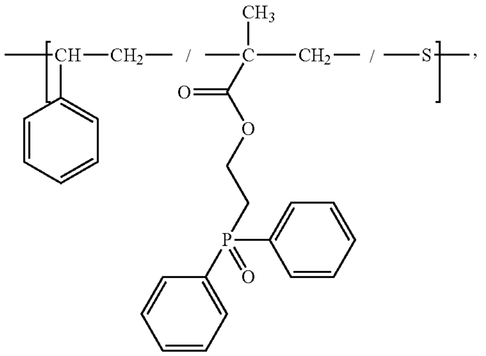

-continued
(14)
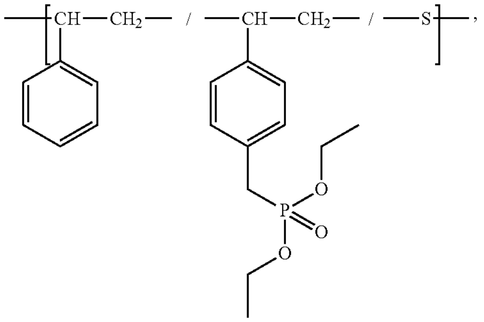
(15)
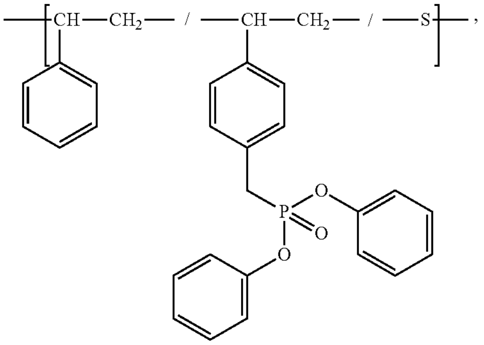
(17)
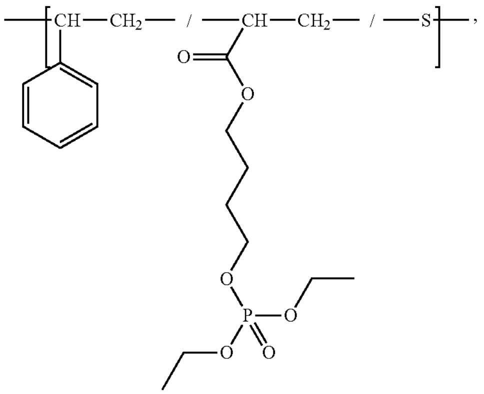
(18)
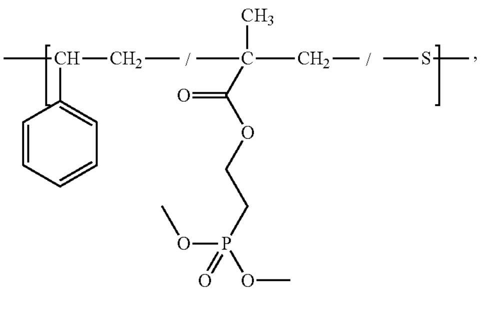
-continued
(19)
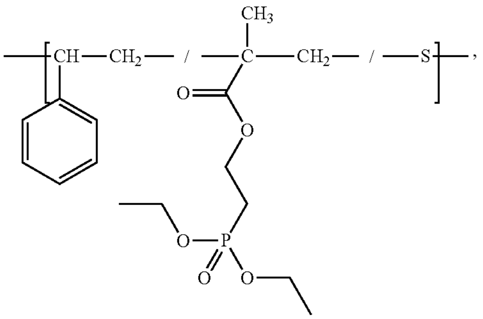
(20)
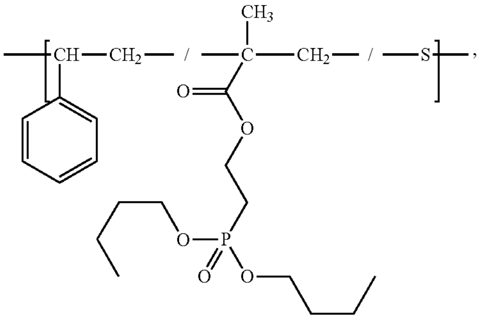
(21)
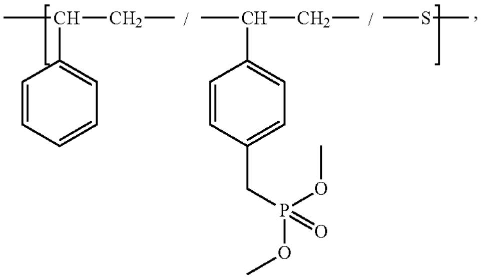
(22)
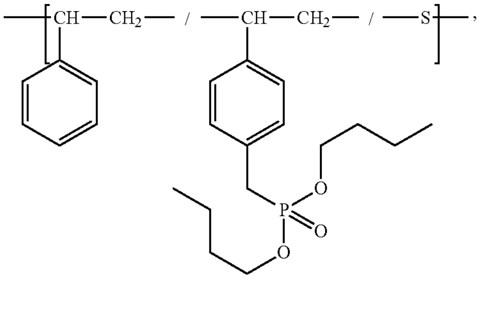
(23)
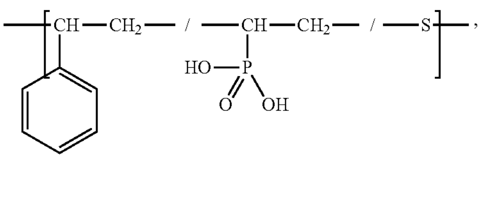
and -continued (24)

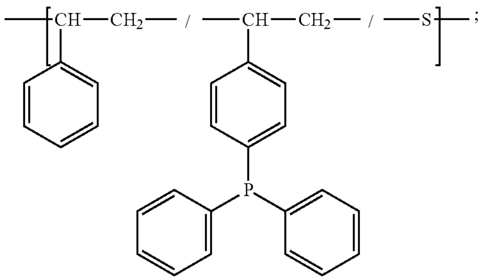

wherein the fire-retardant copolymer contains covalently bonded phosphorus compounds, a $\omega_{[S]}$ in a range of >0 to <0.4, a $\omega_{[Sty]}$ in a range of >0 to <1, and wherein $\omega_{[Sty]}=1-\omega_{[P]}- \ldots -\omega_{[S]}$ or $\omega_{[Sty]}=1-\omega_{[P]}-\omega_{[S]}$.

23. The method according to claim 22, wherein the nonionic surfactant comprises maleic anhydride copolymers (MA), reaction products thereof, and/or mixtures thereof.

24. An insulating component or a structural component comprising the fire-retardant copolymer of claim 1.

* * * * *